United States Patent
Smith et al.

(10) Patent No.: US 12,391,526 B2
(45) Date of Patent: *Aug. 19, 2025

(54) JACKSTAND FOR AUTOMATED TRAILER LOADING DOCK

(71) Applicant: Outrider Technologies, Inc., Brighton, CO (US)

(72) Inventors: Andrew F. Smith, Bend, OR (US); Martin Edward Sotola, Boulder, CO (US); Peter James, Denver, CO (US); Lawrence S. Klein, Bend, OR (US); Matthew Steven Johannes, Arvada, CO (US); Jonathan Record, Highlands Ranch, CO (US); Garold McKinney, Colorado Springs, CO (US)

(73) Assignee: Outrider Technologies, Inc., Brighton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/419,334

(22) Filed: Jan. 22, 2024

(65) Prior Publication Data

US 2024/0158213 A1    May 16, 2024

Related U.S. Application Data

(63) Continuation of application No. 17/675,568, filed on Feb. 18, 2022, now Pat. No. 11,878,897.
(Continued)

(51) Int. Cl.
*B66F 5/00* (2006.01)
*B60D 1/66* (2006.01)
*B60R 9/06* (2006.01)
*B66F 5/02* (2006.01)
*B66F 5/04* (2006.01)

(52) U.S. Cl.
CPC ................ *B66F 5/00* (2013.01); *B60D 1/665* (2013.01); *B60R 9/06* (2013.01); *B66F 5/025* (2013.01); *B66F 5/04* (2013.01)

(58) Field of Classification Search
CPC ...... B60S 9/04; B60S 9/00; B60S 9/20; B60S 9/16; B66F 5/00; B66F 5/02; B66F 5/04
See application file for complete search history.

(56) References Cited

U.S. PATENT DOCUMENTS 5,377,957 A    1/1995  Mosley
5,709,286 A    1/1998  Mead et al.
(Continued)

FOREIGN PATENT DOCUMENTS

FR    2777025 A1    10/1999

OTHER PUBLICATIONS

International Search Report and Written Opinion for PCT/US2022/017003, mailed Jun. 24, 2022, 12 pages.
(Continued)

*Primary Examiner* — Lee D Wilson
(74) *Attorney, Agent, or Firm* — Cozen O'Connor

(57) ABSTRACT

Automated jackstand systems and methods deploy a jackstand to support a front end of a trailer parked at an automated loading dock. The jackstand prevents collapse of the trailer's landing gear and prevents upending of the trailer during loading and unloading. Advantageously, by deploying the jackstand automatically, presence of personnel in the yard where tractors and trailers are moving is not required.

20 Claims, 24 Drawing Sheets

Related U.S. Application Data

(60) Provisional application No. 63/151,601, filed on Feb. 19, 2021.

(56) References Cited

U.S. PATENT DOCUMENTS

| | | | |
|---|---|---|---|
| 5,868,379 | A | 2/1999 | Ellis |
| 6,089,544 | A | 7/2000 | Ellis |
| 7,143,869 | B1 | 12/2006 | Chance |
| 8,191,865 | B2 | 6/2012 | Polins et al. |
| 10,065,689 | B2 | 9/2018 | Wiegel et al. |
| 10,662,043 | B2 | 5/2020 | De Jong |
| 11,878,897 | B2 * | 1/2024 | Smith ............... B60D 1/665 |
| 2006/0119089 | A1 | 6/2006 | Rivers et al. |
| 2016/0001749 | A1 | 1/2016 | Kimener |
| 2019/0315319 | A1 | 10/2019 | Williams |
| 2020/0398910 | A1 | 12/2020 | Di Biase |
| 2022/0267127 | A1 * | 8/2022 | Smith ............... B60D 1/665 |
| 2024/0158213 | A1 * | 5/2024 | Smith ............... B66F 5/00 |

OTHER PUBLICATIONS

U.S. Appl. No. 17/675,568, Ex Parte Quayle Action dated Jun. 28, 2023, 6 pages.

\* cited by examiner

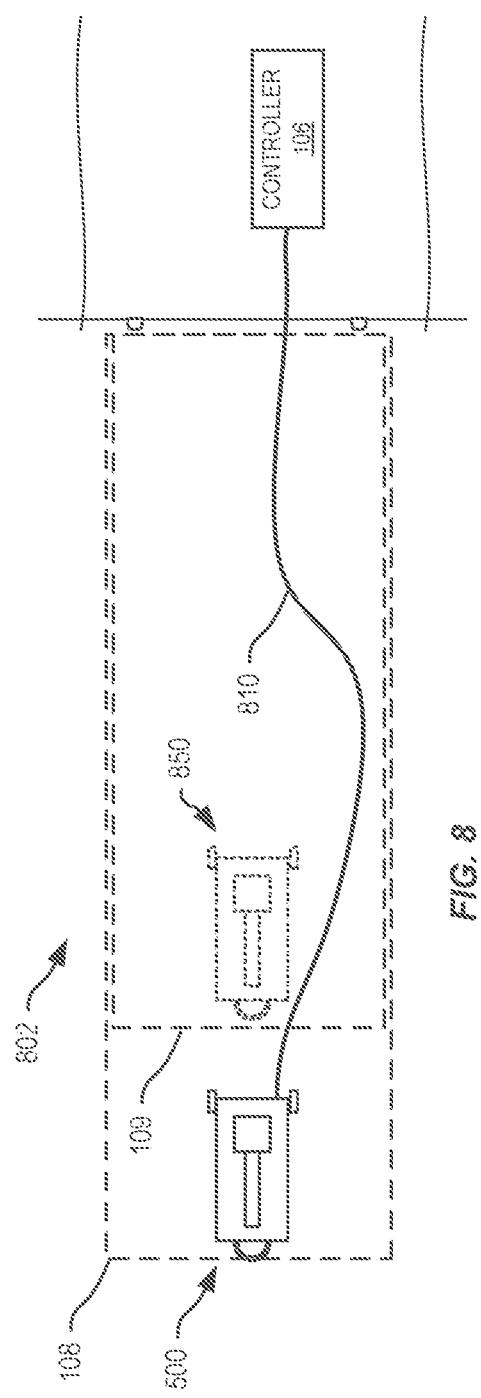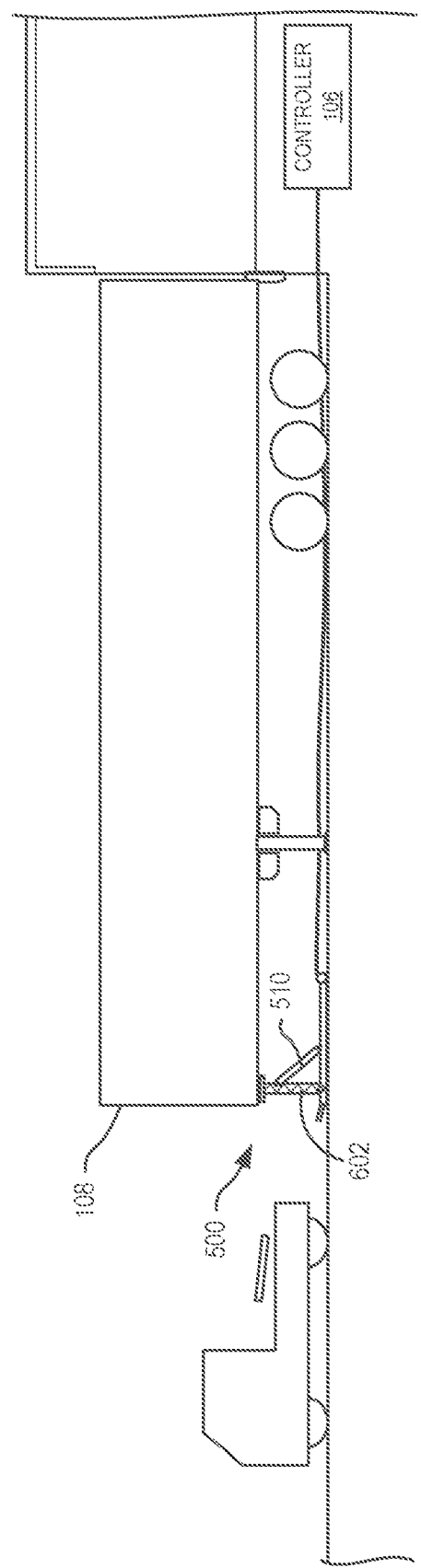

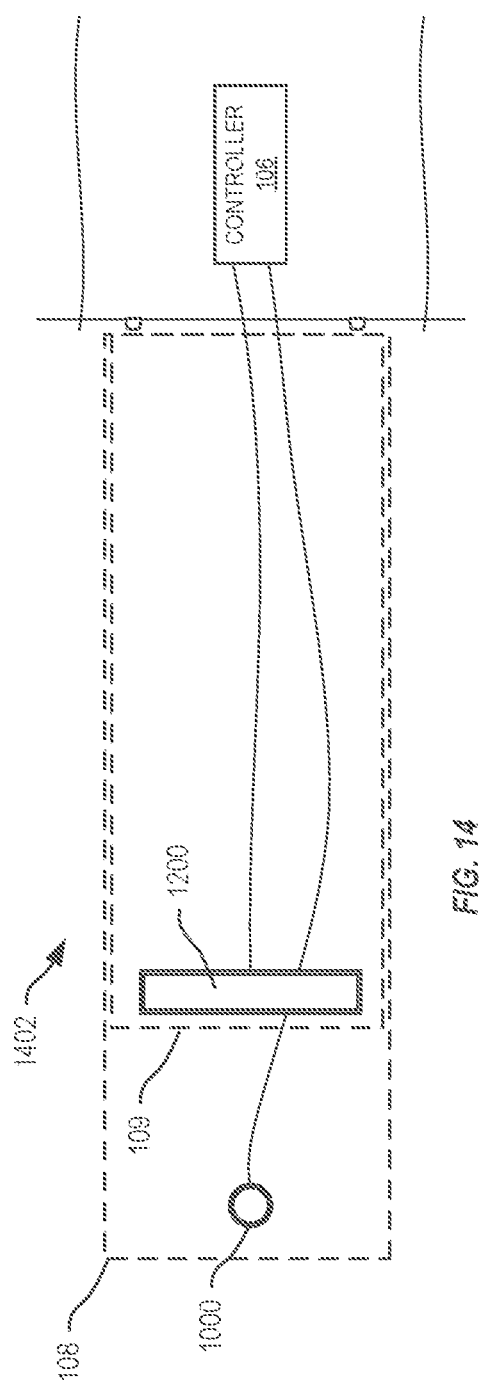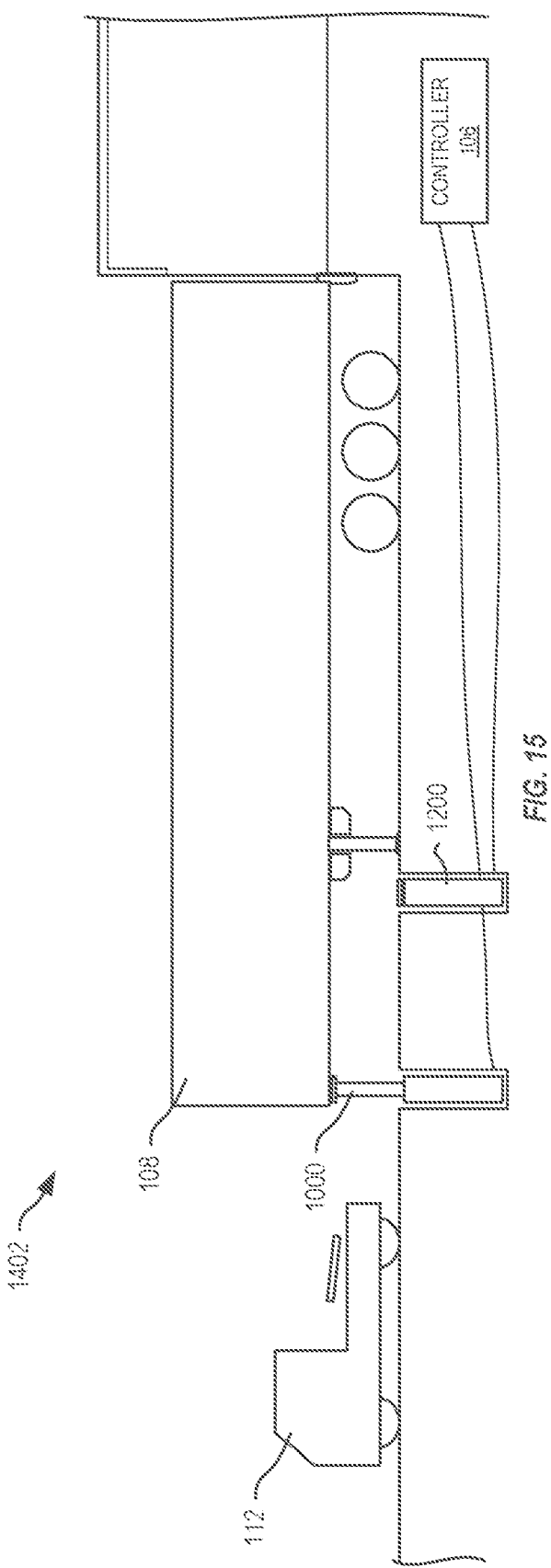

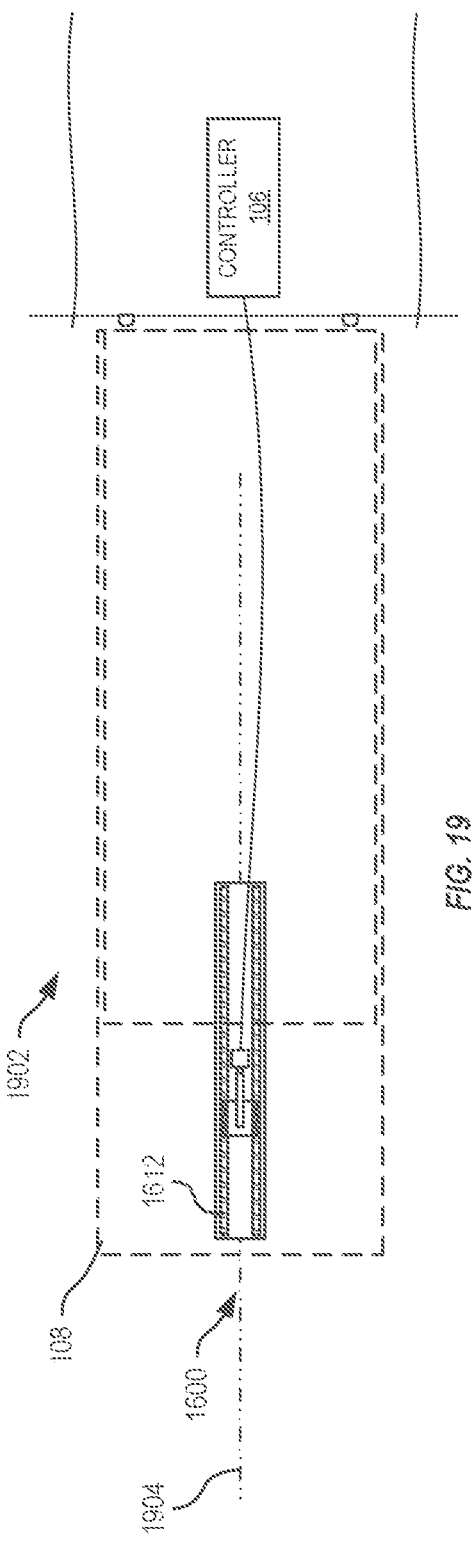
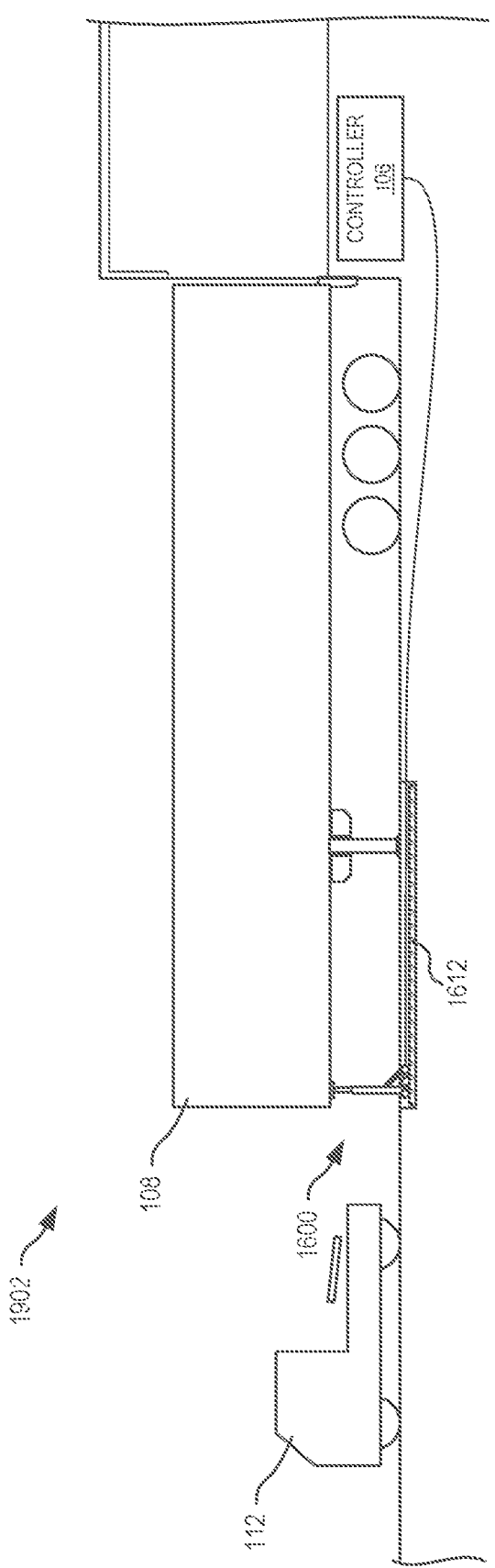

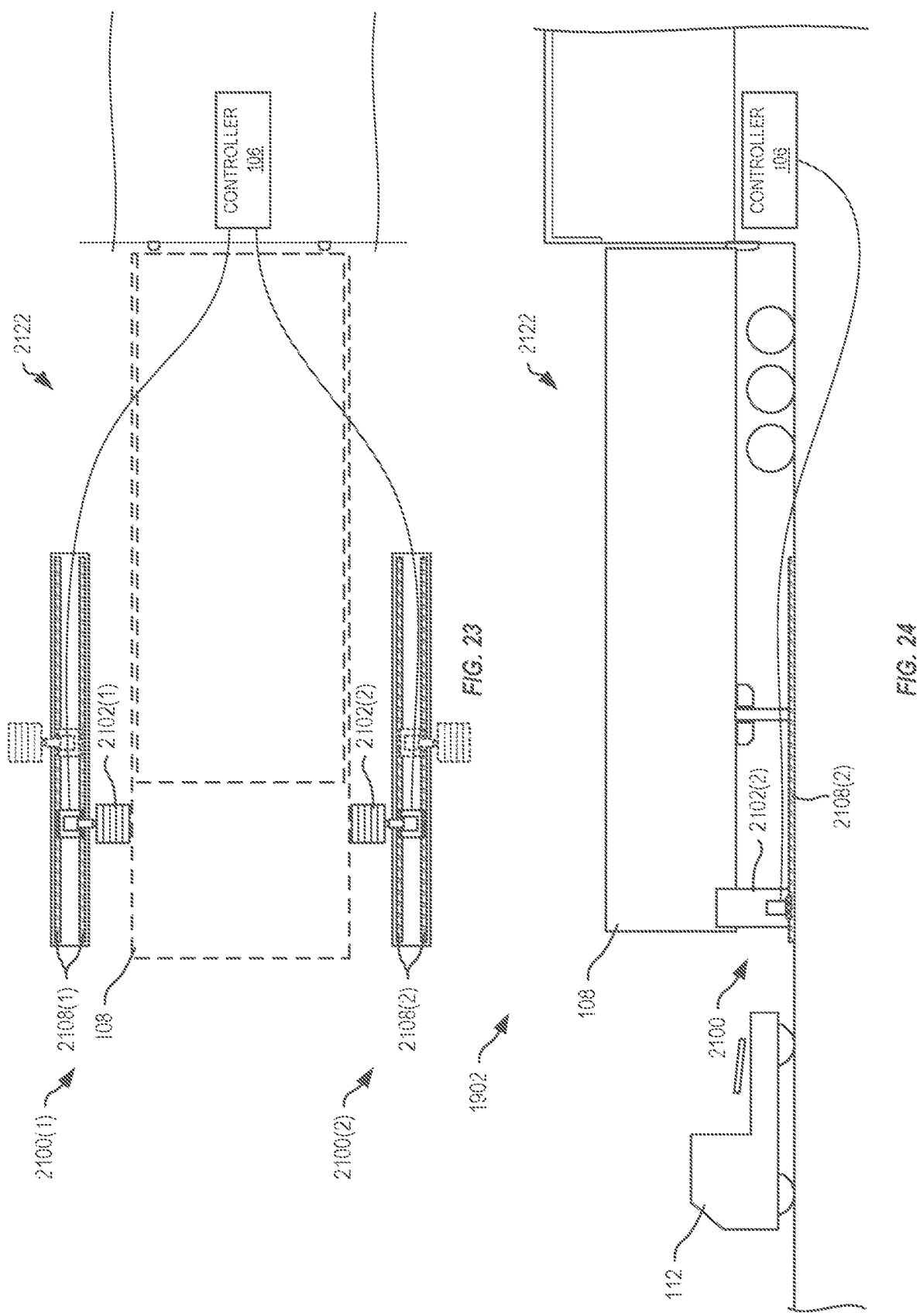

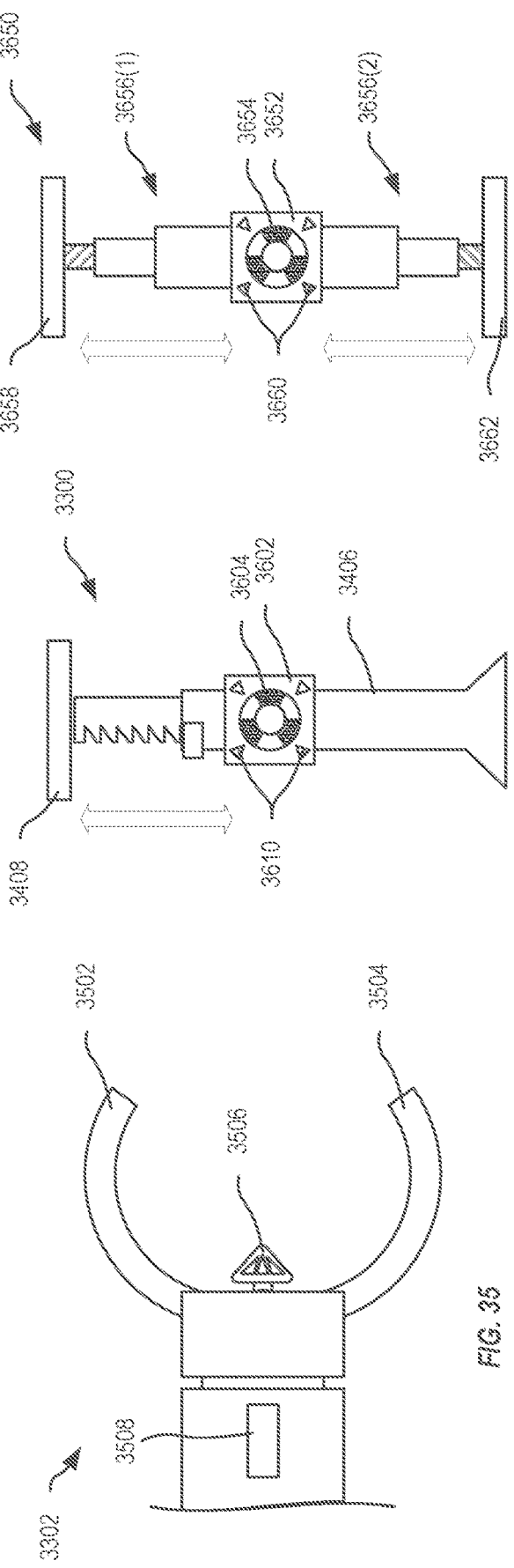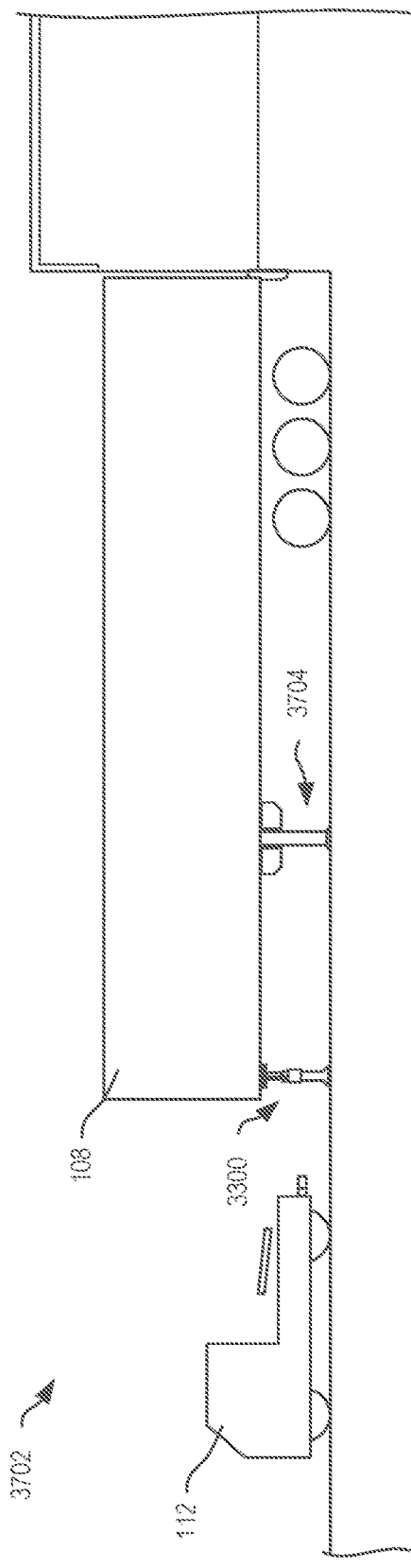

JACKSTAND FOR AUTOMATED TRAILER LOADING DOCK

RELATED APPLICATION

This application is a continuation of pending U.S. patent application Ser. No. 17/675,568, titled "Jackstand for Automated Trailer Loading Dock," filed Feb. 18, 2022, and which claims priority to U.S. Patent Application Ser. No. 63/151,601, titled "Jackstand for Automated Trailer Loading Dock," filed Feb. 19, 2021. Each of the aforementioned applications are incorporated herein by reference in their entirety.

BACKGROUND

Trucking is an essential part of modern commerce where trucks transport materials and finished goods across the continent within their large interior spaces. Such goods are loaded and unloaded at various facilities such as manufacturers, ports, distributors, retailers, and end users. Large over-the road (OTR) trucks typically consist of a tractor or cab unit and a separate detachable trailer that is removably interconnected to the tractor via hitching apparatus that includes a fifth-wheel on the tractor that physically couples with a kingpin on the trailer.

Challenges in trucking relate to docking, loading and unloading of goods to and from trailers. Warehouses and good distribution facilities have yards with multiple loading docks to allow concurrent loading and/or unloading of multiple trailers. A tractor positions its trailer at one of the docks and the tractor detaches, leaving the trailer at the loading dock. When the trailer is loaded and/or unloaded, a tractor (same or different one) couples with the trailer and moves it away from the dock.

SUMMARY

Safety is of utmost concern within the yard where many trailers may be parked for loading/unloading while others are being maneuvered to and from the docks. While parked at a loading dock, it is important to support the trailer as it is being loaded and unloaded, which occurs from the rear of the trailer, requiring that a front portion of the trailer be loaded first and unloaded last. This requirement makes the trailer susceptible to problems that arise when landing gear (the retractable legs positioned towards the front end of the trailer that are lowered when the tractor detaches) collapses and/or allows up-ending (when the landing gear is mounted to far from the front) of the detached trailer due to heavy front loading. Safety requires manual positioning of support (e.g., a jackstand) beneath the front end of the trailer after the tractor decouples and prior to the loading or unloading, and then removal of the support prior to the trailer being recouples to the tractor and moved away from the loading dock. This manual handling of the support is a safety concern for the person(s) handling the support and is particularly undesirable when movement of the trailers within the yard is automated.

In one embodiment, an automated jackstand system supports a front end of a trailer parked at a loading dock. The automated jackstand system includes: a jackstand, having: a jack pad; a vertically extendable component coupling at a first end with the jack pad; a collar positioned on the vertically extendable component; and a mechanical socket positioned on the collar and mechanically geared to extend the vertically extendable component when rotated in a first direction and to retract the vertically extendable component when rotated in a second direction opposite the first direction. The automated jackstand system also includes a grabber positioned at a back end of a yard tractor and having: at least two retractable claws operable by a first motor to removably couple with the collar; and a drive bit operable by a second motor and shaped and sized to mechanically couple with the mechanical socket, wherein the drive bit is positioned between the at least two retractable claws. The automated jackstand system also includes a controller, having machine-readable instructions stored in non-transitory memory that, when executed by a processor, control the first motor and the second motor to deploy the jackstand to support the front end of the trailer.

In another embodiment, a jackstand includes a jack pad, a vertically extendable component coupling at a first end with the jack pad, a collar positioned on the vertically extendable component, a fiducial marking positioned on the collar in a location for imaging by an imager located external to the jackstand, and a mechanical socket positioned on the collar and mechanically geared to extend the vertically extendable component when rotated in a first direction and to retract the vertically extendable component when rotated in a second direction opposite the first direction.

In another embodiment, an automated jackstand supports a front end of a trailer parked at a loading dock. The automated jackstand including: a baseplate; a vertical support coupled to the baseplate by a pivot positioned at a lower end of the vertical support; a jack pad positioned at a top end of the vertical support; an actuator positioned at the baseplate to generate a linear motion parallel to the baseplate; an arm having a first end pivotably coupled to the vertical support and a second end pivotably coupled to the actuator; and wherein the linear motion causes the arm to move the vertical support between a horizontal position and a vertical position.

In another embodiment, an automated jackstand system supports a trailer parked at a loading dock. The automated jackstand system including: a stepped block; a horizontally extendable component coupling at a first end with the stepped block; and a controller for remotely extending the horizontally extendable component to press the stepped block against a first side surface at a front end of the trailer.

In another embodiment, an automated jackstand system supports a trailer parked at a loading dock. The automated jackstand system includes: a jack pad; a vertically extendable component coupling at a first end with the jack pad; and a controller for remotely extending the vertically extendable component to press the jack pad against a lower surface of a front end of the trailer.

In another embodiment, an automated jackstand system supports a front end of a trailer parked at a loading dock. The automated jackstand system includes: a vertical post; a swing arm supported at one end by the vertical post; a first motor mechanically coupled with the vertical post and the swing arm, the first motor being operable to rotate the swing arm about the vertical post; a jackstand coupled with a distal end of the swing arm; and a second motor operable to extend and retract a vertical support of the jackstand.

In another embodiment, an automated jackstand system supports a front end of a trailer parked at a loading dock. The automated jackstand system includes: a vertical post; a swing arm supported at one end by the vertical post; a return spring for returning the swing arm to a resting position; a cable mechanically coupled with the vertical post and the swing arm; and a jackstand coupled with a distal end of the swing arm.

BRIEF DESCRIPTION OF THE FIGURES

FIGS. 5-9 show one example jackstand that may be positioned manually and automatically extended beneath a trailer, in embodiments.

FIGS. 10-15 show one example jackstand that is embedded into the ground of a loading dock for automatic deployment beneath a trailer, in embodiments.

FIGS. 16-20 show one example jackstand mounted on a track for automatic positioning and deployment beneath a trailer, in embodiments.

FIGS. 21-24 show one example jackstand apparatus that uses at least one stepped block to support a trailer at a loading dock, in embodiments.

FIGS. 33-39 show one example jackstand that is deployable by a grabber of a yard tractor, in embodiments.

DETAILED DESCRIPTION OF THE EMBODIMENTS

One aspect of the present embodiments includes the realization that when jackstands are employed at a distribution centers and production facilities to prevent a collapse of a detached trailer due to trailer landing gear failure or to prevent up-ending of the detached trailer due to heavy front loading when the landing gear is mounted further back, a driver and/or ground personnel are required to locate and properly position a jackstand under the front of the trailer each time the trailer detaches from a tractor unit, and that the driver and/or ground personnel and also required to retract and stow the jackstand prior to attaching a tractor unit and moving the trailer. The present embodiments solve this problem by automatically deploying a jackstand at the front end of a trailer to provide safety and support of the trailer once the tractor unit detaches.

Figure 1:
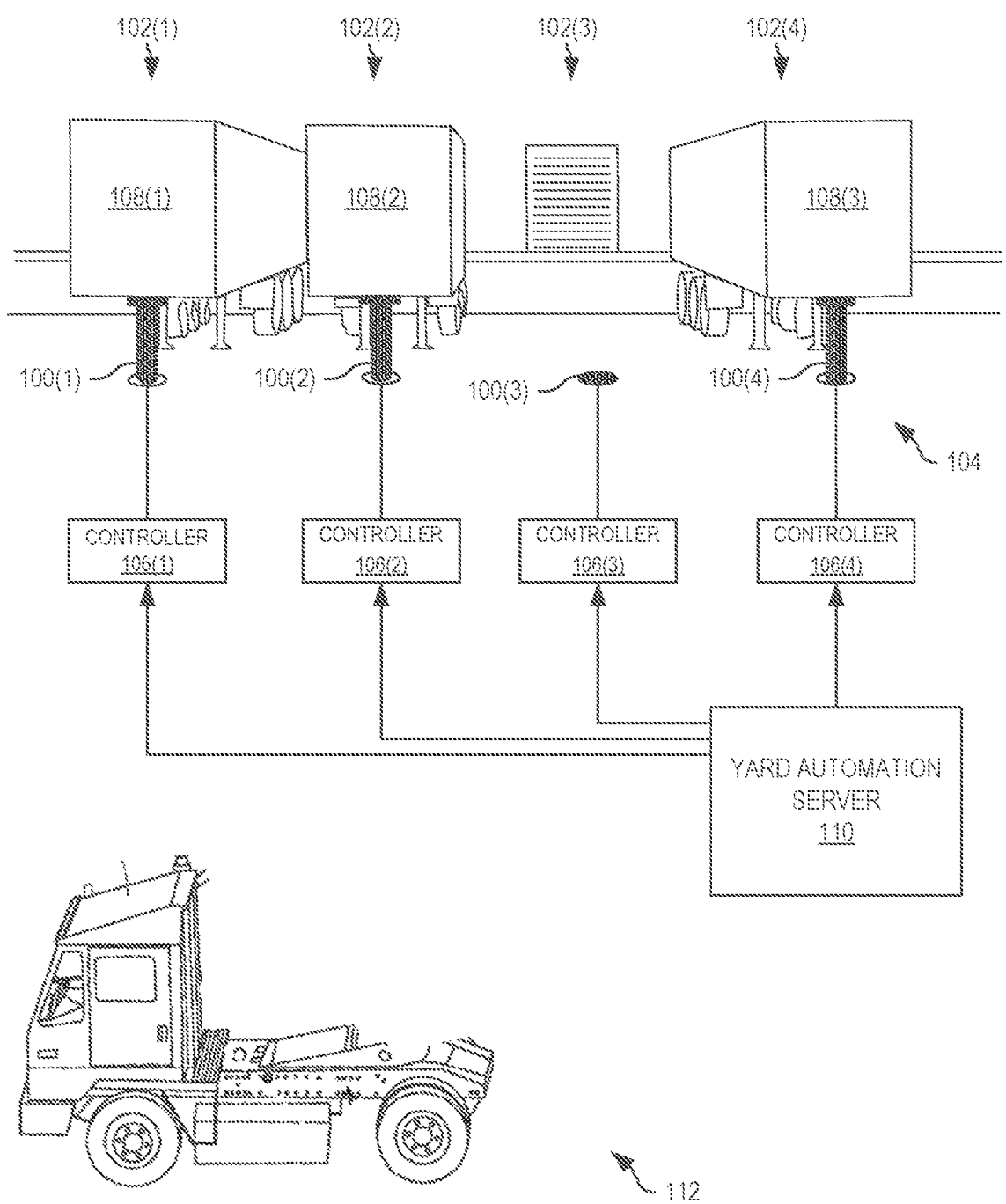
FIG. 1 is a perspective view showing one example jackstand for an automated trailer loading dock in a warehouse yard, in embodiments.

FIG. 1 is a perspective view showing example jackstands 100 for an automated trailer loading dock 102 in a warehouse yard 104. Each jackstand 100 is coupled with an controller 106 that moves, under control of a yard automation server 110, jackstand 100 to provide safety support of a detached trailer 108 at loading dock 102. In certain embodiments, trailers 108 within yard 104 are moved by a yard tractor 112 that is controlled by yard automation server 110. For example, yard automation server 110 may control yard tractor 112 to position trailer 108 at loading dock 102 for loading/unloading and move trailer 108 away from loading dock 102 when loading/unloading is completed. Accordingly, yard automation server 110 automatically deploys jackstand 100 after yard tractor 112 decouples from trailer 108, and automatically retracts jackstand 100 prior to yard tractor 112 recoupling with trailer 108. Advantageously, jackstand 100 provides safety for loading and unloading of trailers at loading dock 102 without requiring manual deployment.

Although jackstand 100 is shown embedded into the ground, jackstand 100 may represent any of the following embodiments.

Automated Jackstands

Figure 4:
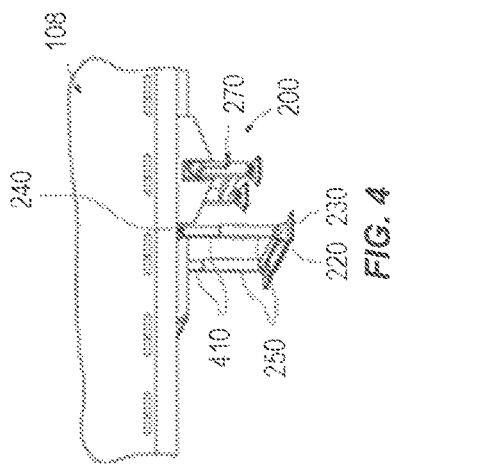
FIGS. 2-4 show one example automated jackstand that is pivotably movable between a flush position and a deployed position, in embodiments.
Figure 3:
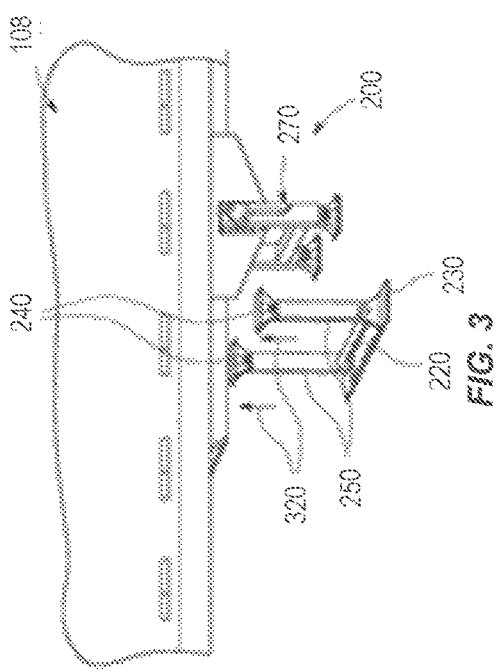
Figure 2:
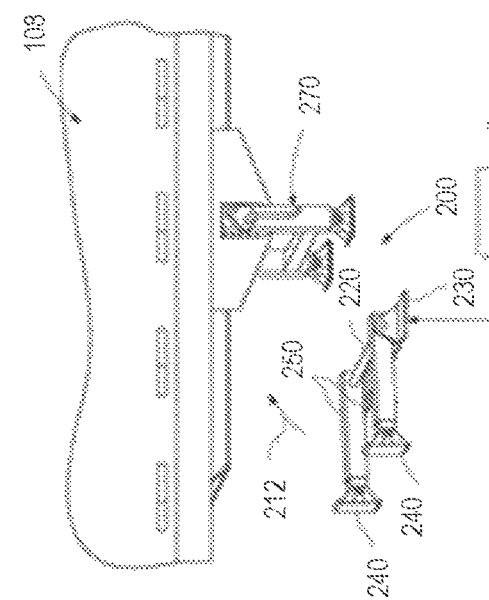

FIGS. 2-4 show an automated jackstand 200 in which the trailer jackstand is pivotably movable between a flush position against the ground (FIG. 2) and an auto-deployed position, in which it pivots (curved arrow 212, about pivot axle 220) on its base 230. In this upright, deployed position (FIG. 3), the jack pads 240 on spaced apart legs 250 confront the bottom of the trailer 108. The jack pads 240 are then moved upwardly (arrows 320) on telescoping members 410 of the legs 250 until they pressurably engage the bottom of the trailer 108.

Hydraulic or pneumatic pistons can be used to drive the telescoping members 410. Likewise, a hydraulic, pneumatic or electromechanical system, with appropriate locking device(s), can be used to pivot the jackstand from a grounded orientation (FIG. 2) to a deployed orientation (FIGS. 3 and 4). The engagement of the jack pads 240 with the bottom of the trailer 108, provides further support for the landing gear 270, as well as the added benefit of securing the trailer against skidding away from the loading dock in the manner of wheel chocks. The automated jackstand 100 may either be permanently anchored to the ground for specific length trailers, or alternately, may be mounted on a sliding track that rides beneath the trailer, thereby allowing flexibility of variable trailer lengths, communicated via yard automation server 110 to a jackstand controller 106, which also controls pivoting deployment. In certain embodiments, jackstand 200 is manually deployed by a person at the dock once trailer 108 is parked at the dock and the tractor 112 has detached. In other embodiments, jackstand 200 is automatically deployed by yard automation server 110, for example, when yard tractor 112 indicates that trailer 108 is positioned at dock 102 and is detached.

One or more sensors may be used to ensure correct deployment of jackstand 200. In one embodiment, a pressure sensor or a force sensor is coupled with jack pad 240 to sense pressure of jack pad 240 against the bottom of the trailer 108. In another embodiment, pressure sensors are configured to sense pressure within a supply line to a lower chamber of a hydraulic cylinder that moves the jack pads 240 upwards, whereby an increase in pressure indicates contact of jack pads 240 against the bottom of the trailer 108. In another embodiment where telescoping members 410 of the legs 250 are moved by electric motor, a current sensor may sense current driving the motor, whereby an increase in current indicates pressure of jack pads 240 against the bottom of the trailer 108. In another embodiment, one or more inertial measurement units (IMU) and/or accelerometers are coupled with jack pads 240 or telescoping members 410 to sense when jack pads 240 contact the bottom of the trailer 108. In another embodiment, jack pads 240 include at least one limit switch that is depressed when jack pads 240 are pressed against the bottom of the trailer 108. In another embodiment, jackstand 200 includes at least one ultrasonic and/or laser range finder type sensor that measures a distance/range between jack pads 240 and the bottom of the trailer 108. In another embodiment, at least one jack pad 240 includes an inductive sensor that senses proximity of the bottom of the trailer 108 when a fifth-wheel plate of trailer 108 is magnetic and/or ferrous. These sensors provide feedback that allows controller 106 to determine when jackstand 200 is correctly deployed.

Trolley-Jack Style

Figure 5:
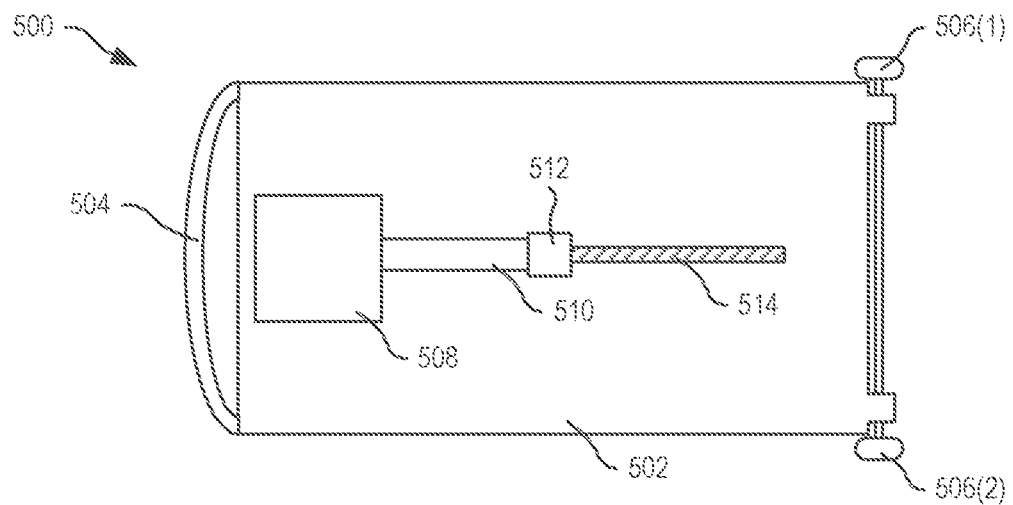
Figure 6:
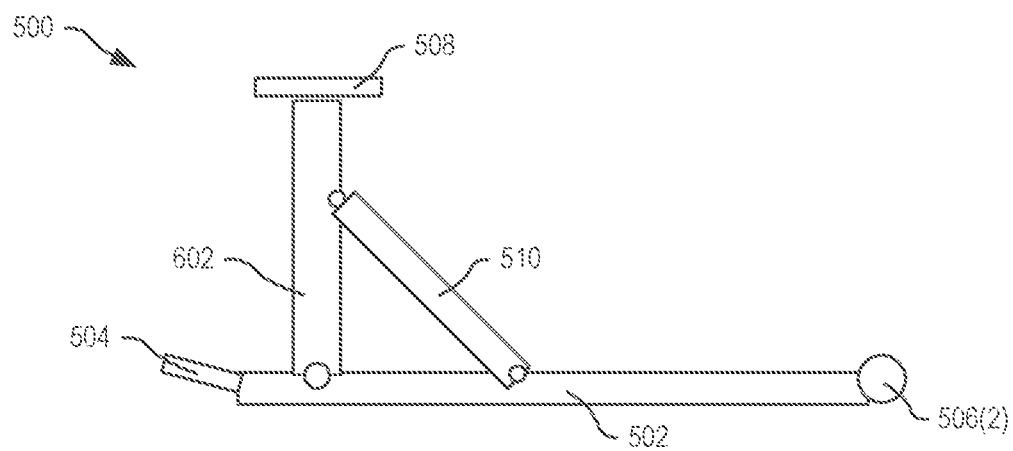
Figure 7:
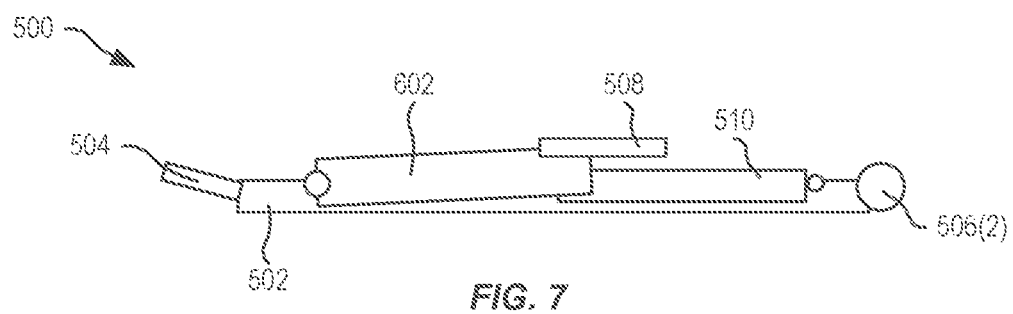
Figure 10:
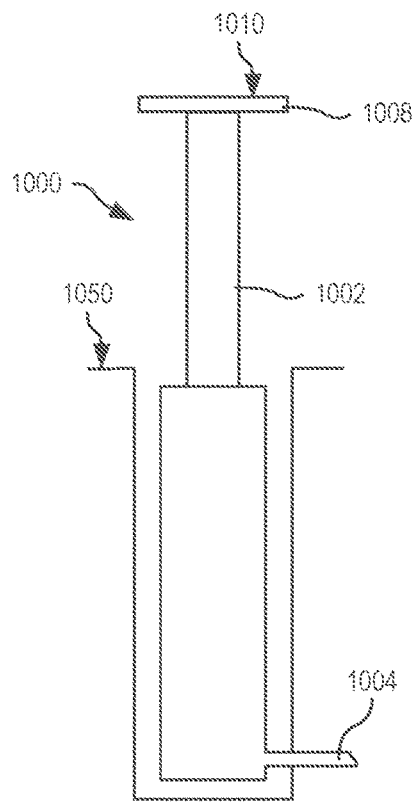
Figure 11:
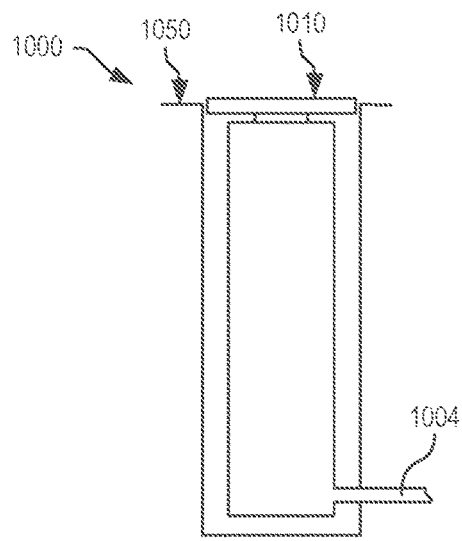

FIGS. 5-9 show one example jackstand 500 that may be positioned manually and automatically extended (e.g., deployed) beneath trailer 108. FIG. 5 is a plan view and FIG. 6 is a side elevation of jackstand 500 in an extended state. FIG. 7 is a side elevation of jackstand 500 is a retracted state. FIG. 8 is a plan view of a loading dock 802 showing jackstand 500 positioned to support a front end of a long trailer 108 (e.g., 57 feet, shown in dashed outline). FIG. 9 is a side elevation of loading dock 802 with jackstand 500 extended to support the front end of trailer 108. FIGS. 5-9 are best viewed together with the following description.

Jackstand 500 includes a baseplate 502 that has a handle 504 positioned at one end and at least one wheel 506 (e.g., shown with two wheels 506(1) and 506(2)) positioned at an opposite end. Handle 504 allows a person to lift that end of jackstand 500 such that jackstand 500 may roll on wheel(s) 506. In certain embodiments, wheels 506 are positioned such that, when baseplate 502 is flat on the ground, wheels 506 provide no support, but when handle 504 is lifted, wheels 506 contact the ground to provide support of baseplate 502. Baseplate 502 may include a dense rubber matt affixed to a lower surface of the baseplate to provide better grip of a concrete surface (which may have micro grit/pebbles, etc.). Jackstand 500 has at least one leg 602 that is pivotably attached to one end of baseplate 502 and has a jack pad 508 pivotably attached to the opposite end. A first end of a deployment arm 510 is pivotably attached to the at least one leg 602 and an opposite end of the deployment arm 510 is pivotably attached to a carriage 512 mechanically coupled with an actuator 514 (e.g., a linear actuator). In one example, actuator 514 is a screw mechanism that includes a threaded rod that is turned by a motor to move carriage 512, also threaded and mechanically engaged with actuator 514, in a straight line along a plane parallel to baseplate 502. In another embodiment, actuator 514 is a hydraulic piston that moves carriage 512 in a straight line along a plane parallel to baseplate 502. As carriage 512 moves, deployment arm 510 moves leg 602 between a flat position shown in FIG. 7 to a vertical position shown in FIG. 6.

In certain embodiments, leg 602 is sized to press jack pad 508 against a lower surface of trailer 108, as shown in FIG. 9, as leg 602 reaches a vertical position. In other embodiments, leg 602 is sized to reach a vertical position without jack pad 508 contacting the lower surface of trailer 108, and leg 602 includes an extension mechanism (not shown) that extends vertically to press jack pad 508 against the lower surface of trailer 108. The extension mechanism could be any one or more of a screw jack, a hydraulic jack, a scissor jack, and so on.

Advantageously, jackstand 500 may be easily repositioned to accommodate trailers of different sizes. For example, as shown in FIG. 8, for a short trailer 109, jackstand 500 may be moved to position 850 prior to deployment beneath a front end of short trailer 109. This is particularly beneficial for accommodating trailers of non-standard lengths at loading dock 802. Further, since jackstand 500 folds down flat when not deployed, jackstand 500 is below the ground clearance height of trailer 108 and may thereby be left in position as trailer 108 is moved in and/or out of loading dock 802. Jackstand 500 may be remotely deployed by a controller 106 via a coupling 810 (e.g., an electrical cable and/or a hydraulic and/or pneumatic hose) and may be semi-autonomously controlled by yard automation server 110.

One or more sensors may be used to ensure correct deployment of jackstand 500. In one embodiment, a pressure sensor or a force sensor is coupled with jack pad 508 to sense pressure of jack pad 508 against the bottom of trailer 108. In another embodiment, pressure sensors are configured to sense pressure within a supply line to a lower chamber of a hydraulic cylinder within extendable leg 602 that moves the jack pads 508 upwards, whereby an increase in pressure indicates contact of jack pads 508 against the bottom of trailer 108. In another embodiment, one or more inertial measurement units (IMU) and/or accelerometers are coupled with jack pads 508 to sense when jack pads 508 contact the bottom of trailer 108. In another embodiment, jack pads 508 include at least one limit switch that is depressed (e.g., coupled to a pin that extends above the top surface of jack pad 508) when jack pads 508 are pressed against the bottom of trailer 108. In another embodiment, jackstand 500 includes at least one ultrasonic and/or laser range finder type sensor that measures a distance/range between jack pads 508 and the bottom of trailer 108. In another embodiment, jack pad 508 includes an inductive sensor that senses proximity of the bottom of trailer 108 when a fifth-wheel plate of trailer 108 is magnetic and/or ferrous. These sensors provide feedback that allows controller 106, or a person when manually controlled, to determine when jackstand 500 is correctly deployed.

Embedded Style

Figure 12:
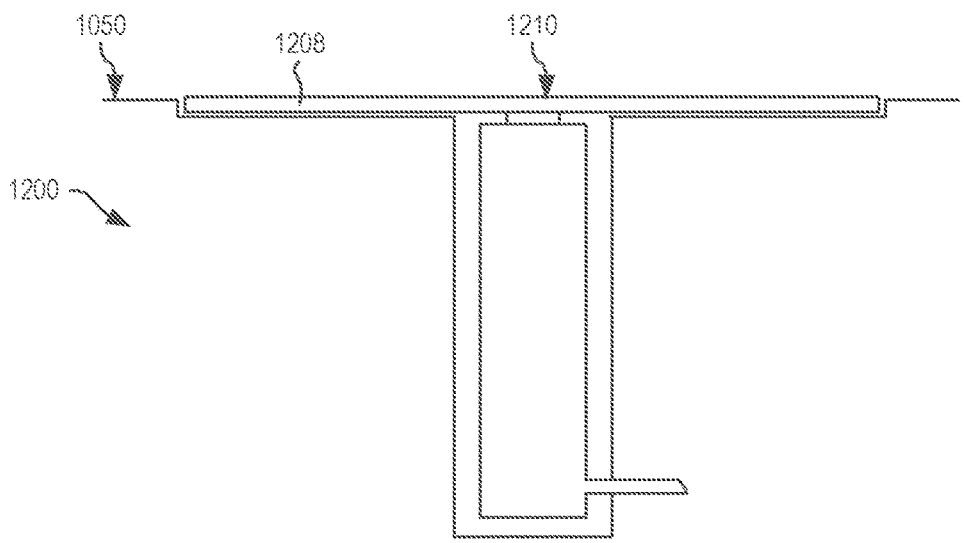
Figure 13:
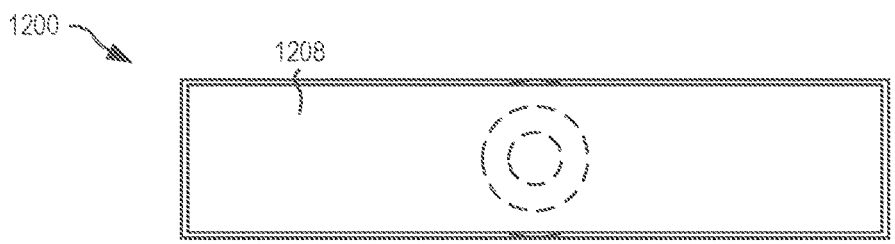

FIGS. 10, 11, 14 and 15 show one example jackstand 1000 that is embedded into the ground of a loading dock 1402 (e.g., loading dock 102, FIG. 1) and may be automatically extended (e.g., deployed) beneath a trailer (e.g., trailer 108, FIG. 1). FIGS. 12 and 13 show one example jackstand 1200, similar to jackstand 1000 of FIGS. 10 and 11 but is configured with an enlarged jack pad 1208 for improved contact and force distribution across a bottom surface of trailer 108. FIGS. 10-15 are best viewed together with the following description.

Jackstand 1000 includes a piston 1002 operable to move a jack pad 1008 in a vertical direction between ground level 1050 and a front end lower surface of a trailer 108. That is, when not deployed, a top surface 1010 of jack pad 1008 is positioned substantially at ground level 1050, and piston 1002 is operable to raise jack pad 1008 to a height greater than a lower surface of the trailer front end. Accordingly, jackstand 1000 can support the weight at the front end of trailer 108. In the examples of FIGS. 10, 11, 14 and 15, jack pad 1008 is circular, but could be of any shape or size that is suitable for contacting and supporting the front end of trailer 108. For example, as shown in FIGS. 12 and 13, jackstand 1200 is similar to jackstand 1000 but jack pad 1008 is replaced with jack pad 1208 that is rectangular to provide improved contact and load distribution across the lower surface of the front end of trailer 108. An upper surface 1210 of jack pad 1208 is substantially at ground level 1050 when jackstand 1200 is not deployed.

As shown in FIGS. 14 and 15, one or more jackstands 1000 and/or 1200 may be embedded into the ground of a loading dock (e.g., loading dock 102, FIG. 1) and may be automatically extended (e.g., deployed) beneath a trailer 108. Particularly, one or more jackstands 1000 and/or 1200 are positioned to accommodate different lengths of trailer. As shown in the example of FIG. 14, jackstand 1000 is positioned to be beneath a front of trailer 108 and jackstand 1200 is positioned to be at a front of short trailer 109. Advantageously, multiple jackstands 1000/1200 (e.g., of either type) may be positioned within loading to accommodate trailers of different lengths. For example, commonly used trailer lengths include 20, 40, 45, 48, and 53 feet. As described above, controller 106 may be controlled by yard automation server 110 to deploy the appropriate jackstand 1000/1200, since yard automation server 110 is aware of the length of each trailer 108/109 being positioned at loading docks 1402.

One or more sensors may be used to ensure correct deployment of jackstands 1000 and/or 1200. In one embodiment, a pressure sensor or a force sensor is coupled with jack pad 1008/1208 to sense pressure of jack pad 1008/1208 against the bottom of trailer 108. In another embodiment, pressure sensors are configured to sense pressure within a supply line 1004 to a lower chamber of a hydraulic cylinder that moves the jack pad 1008/1208 upwards, whereby an increase in pressure indicates contact of jack pad 1008/1208 against the bottom of trailer 108. In another embodiment, one or more inertial measurement units (IMU) and/or accelerometers are coupled with jack pad 1008/1208 to sense when jack pad 1008/1208 contacts the bottom of trailer 108. In another embodiment, jack pad 1008/1208 includes at least one limit switch that is depressed when jack pad 1008/1208 are pressed against the bottom of trailer 108. In another embodiment, jackstand 1000/1200 includes at least one ultrasonic and/or laser range finder type sensor that measures a distance/range between jack pad 1008/1208 and the bottom of trailer 108. In another embodiment, jack pad 1008/1208 includes one or more inductive sensors that senses proximity of the bottom of trailer 108 when a fifth-wheel plate of trailer 108 is magnetic and/or ferrous. These sensors provide feedback that allows controller 106 to determine when jackstand 1000/1200 is correctly deployed.

Central Track Mount

Figure 16:
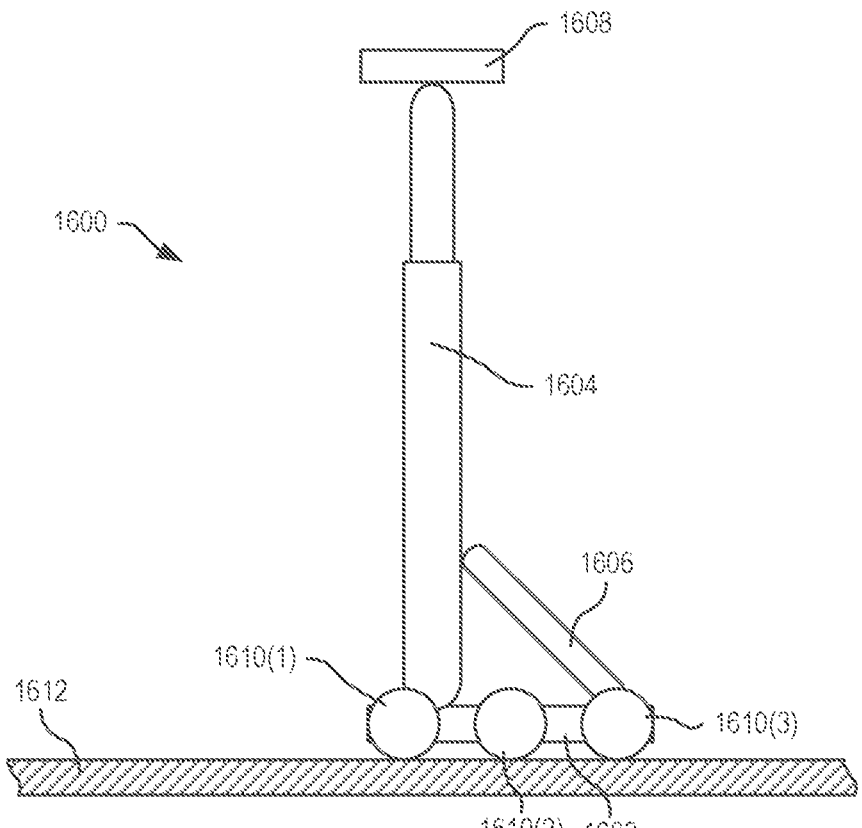
Figure 17:
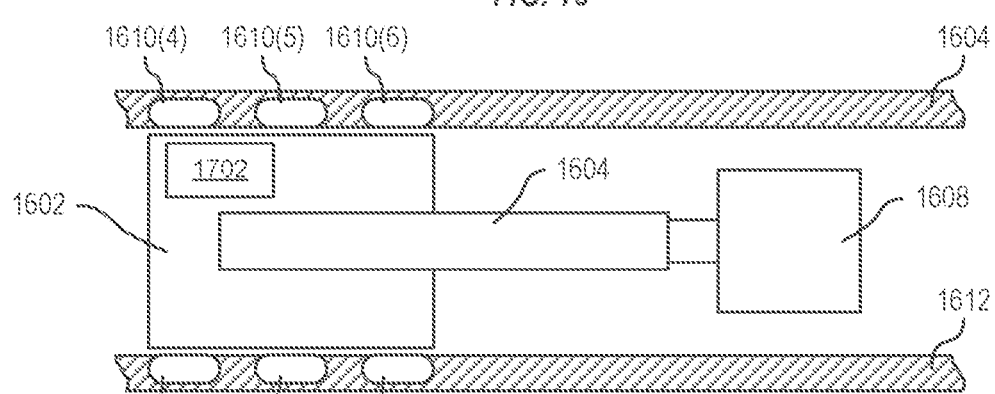
Figure 18:
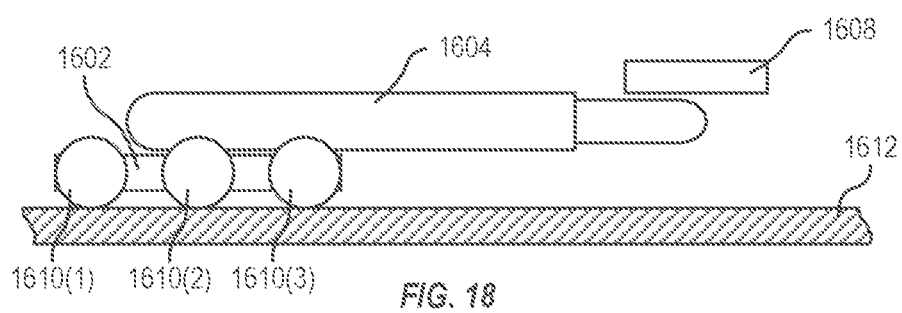

FIGS. 16-20 show one example jackstand 1600 mounted on a track 1612 for automatic positioning and deployment beneath a trailer. FIG. 16 is a side elevation showing jackstand 1600 in a deployed position. FIG. 17 is a top view showing jackstand 1600 in a folded position. FIG. 18 is a side elevation showing jackstand 1600 in the folded position. FIG. 19 is a top view of jackstand 1600 positioned centrally in a loading dock 1902. FIG. 20 is a side elevation showing jackstand 1600 deployed in loading dock 1902 of FIG. 19. FIGS. 16-20 are best viewed together with the following description.

Jackstand 1600 includes a baseplate 1602 that pivotably supports a first end of an extendable leg 1604 that is moved (about the pivot) between a horizontal position and a vertical position by a deployment arm 1606. A jack pad 1608 is pivotably attached to a second end (opposite the first end) of extendable leg 1604 and may be positioned by extendable leg 1604 to press against an under surface of a front end of trailer 108. In certain embodiments, deployment arm 1606 is a hydraulic piston. In other embodiments, deployment arm 1606 is a screw mechanism that raises and lowers extendable leg 1604.

Baseplate 1602 also include a plurality of wheels 1610 aligned and positioned to run on tracks 1612 that may be positioned at or below ground level within loading dock 1902. In certain embodiments, wheels 1610 are driven by a motor 1702, under control of controller 106, to move along track 1612. However, other components (e.g., hydraulic rams, screw mechanism, cables, belt, rack-and-pinion, and so on) may be used to move baseplate 1602 along tracks 1612. Although shown as wheels running on top of a track, other arrangements are envisaged for preventing the baseplate from becoming derailed from the tracks. In certain embodiments, one or more sensors and/or encoders are included to determine a location of baseplate 1602 along tracks 1612. In one example, motor 1702 includes an encoder to measure movement of baseplate 1602. In another example, baseplate 1602 includes a horizontal laser/ultrasonic rangefinder that measures a distance between baseplate 1602 and dock 1902. In another example, a linear potentiometer is used to measure distance between baseplate 1602 and dock 1902. In another example, baseplate 1602 includes a camera for capturing images indicative of a distance between baseplate 1602 and dock 1902.

In certain embodiments, jackstand 1600 includes one or more of a vertical laser/ultrasonic rangefinder, and a camera, that provides input to enable controller 106 to detect a front end of trailer 108, and thereby position baseplate 1602 beneath a front end of trailer 108. In certain embodiments, tractor 112 may provide a location of the front end of trailer 108 to controller 106 and/or yard automation server 110 when dropping trailer 108 at dock 1902.

In FIGS. 16-20, extendable leg 1604 is shown as a hydraulic piston, but extendable leg 1604 may be implemented in in other ways without departing from the scope hereof. In one example, extendable leg 1604 is implemented as a scissor mechanism driven by an electric motor that raises and lowers jack pad 1608 relative to baseplate 1602. In another example, extendable leg 1604 is implemented as a screw mechanism, driven by an electric motor, that raises and lowers jack pad 1608 relative to baseplate 1602.

As shown in FIG. 19, track 1612 may be aligned with a center line 1904 of loading dock 1902 such that wheels of trailer 108, when maneuvered into loading dock 1902, straddle jackstand 1600. Where loading dock 1902 is angled, track 1612 may also be angled. Jackstand 1600 folds down flat, as shown in FIGS. 17-19, such that a highest point of jackstand 1600 is below a ground clearance height of trailer 108. Yard automation server 110 may instruct controller 106 to retract jackstand 1600 prior to movement of trailer 108 to or from loading dock 1902. In certain embodiments, yard automation server 110 may also position baseplate 1602 nearer to the dock to reduce likelihood of wheels of trailer 108 running over jackstand 1600 during maneuvering into and out of loading dock 1902. However, since jackstand 1600 is substantially flat and durable, even when run over by wheels of trailer 108, neither trailer 108 nor jackstand 1600 are likely damaged. In the example of FIG. 20, track 1612 is positioned below a surface of the ground, thereby further reducing likelihood of damage from inadvertent contact between a wheel of trailer 108 and jackstand 1600.

One or more sensors may be used to ensure correct deployment of jackstand 1600. In one embodiment, a pressure sensor or a force sensor is coupled with jack pad 1608 to sense pressure of jack pad 1608 against the bottom of trailer 108. In another embodiment, pressure sensors are configured to sense pressure within a supply line to a lower chamber of a hydraulic cylinder within extendable leg 1604 that moves the jack pad 1608 upwards, whereby an increase in pressure indicates contact of jack pad 1608 against the bottom of trailer 108. In another embodiment, one or more inertial measurement units (IMU) and/or accelerometers are coupled with jack pad 1608 to sense when jack pad 1608 contacts the bottom of trailer 108. In another embodiment, jack pad 1608 includes at least one limit switch that is depressed when jack pad 1608 presses against the bottom of trailer 108. In another embodiment, jackstand 1600 includes at least one ultrasonic and/or laser range finder type sensor that measures a distance/range between jack pad 1608 and the bottom of trailer 108. In another embodiment, jack pad 1608 includes an inductive sensor that senses proximity of the bottom of trailer 108 when a fifth-wheel plate of trailer 108 is magnetic and/or ferrous. These sensors provide feedback that allows controller 106 to determine when jackstand 1000/1200 is correctly deployed.

Stepped Supports

Figure 21:
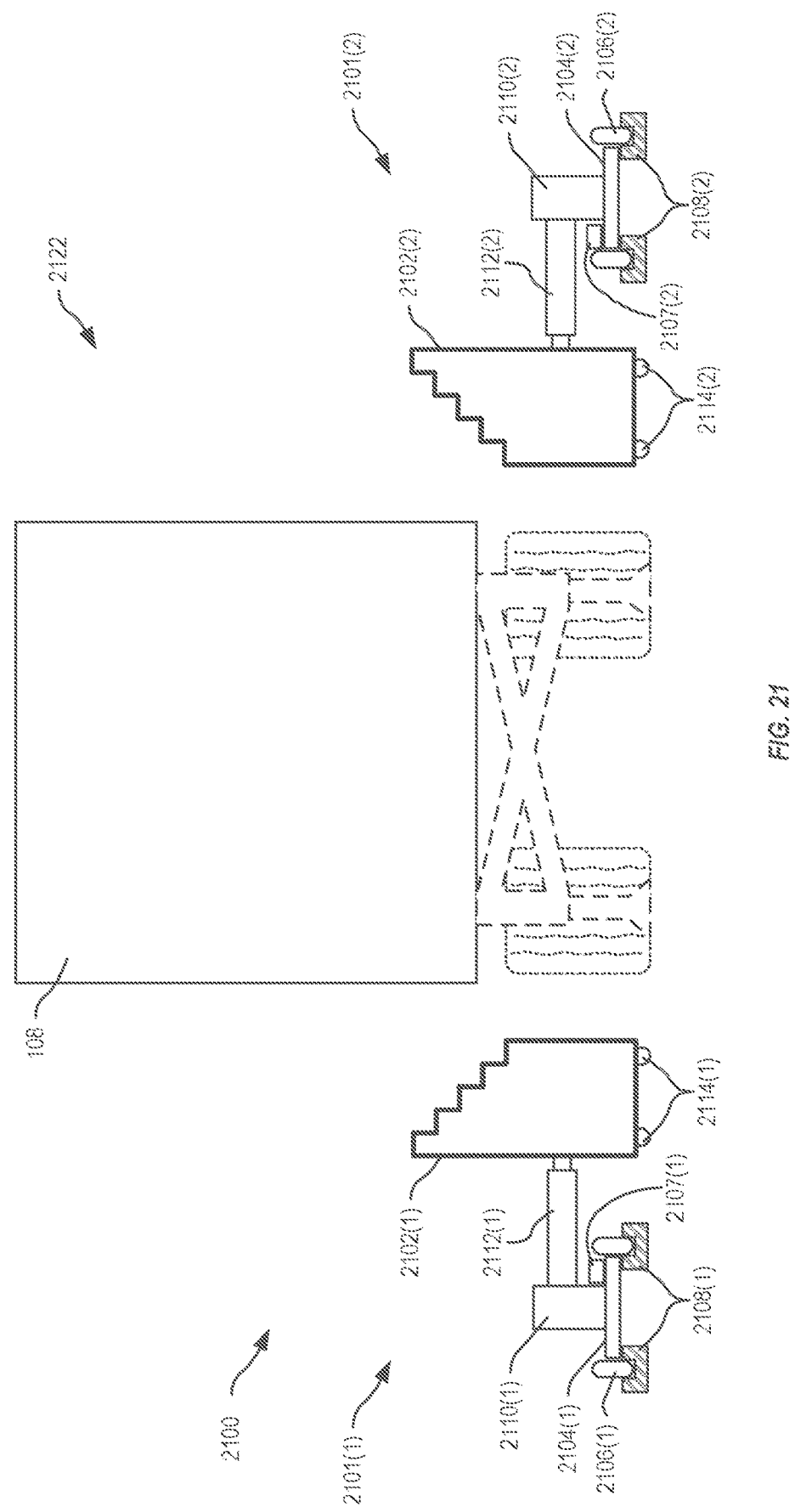
Figure 22:
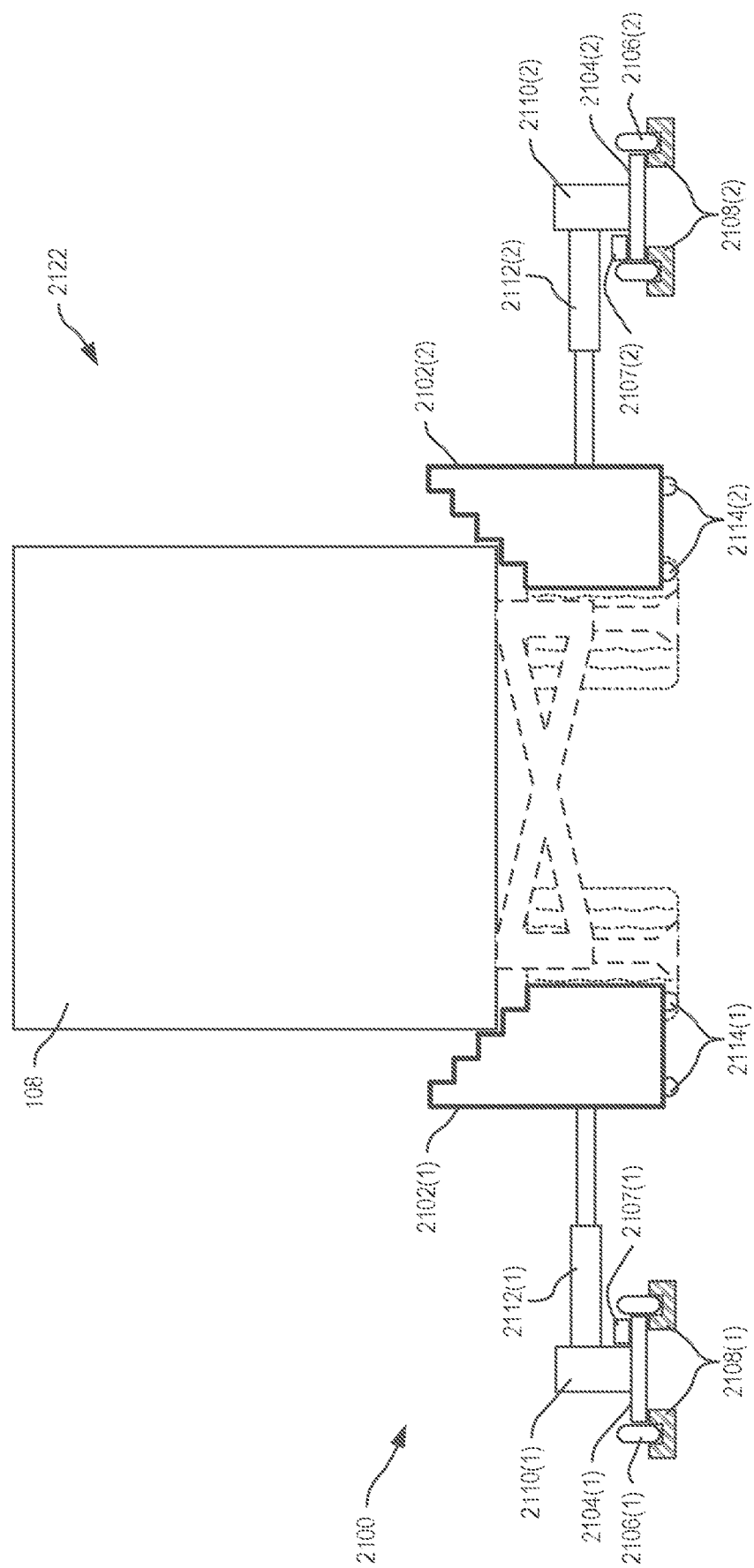

FIGS. 21-24 show one example jackstand apparatus 2100 that uses at least one stepped block 2102 to support trailer 108 at a loading dock 2122. FIG. 21 is an end elevation showing a front of trailer 108 positioned at loading dock 2122, decoupled from yard tractor 112, prior to deployment of stepped blocks 2102 of jackstand apparatus 2100. FIG. 22 is an end elevation, similar to FIG. 21, showing the front of trailer 108 with stepped blocks 2102 of jackstand apparatus 2100 deployed to support the front of trailer 108. FIG. 23 is a top view of jackstand apparatus 2100 positioned on both sides of loading dock 2122. FIG. 24 is a side elevation showing jackstand apparatus 2100 deployed in loading dock 2122 of FIG. 21. FIGS. 21-24 are best viewed together with the following description.

In the example of FIGS. 21-24, jackstand apparatus 2100 has two similar parts 2101(1) and 2101(2), each part 2101 being positioned at opposite sides of loading dock 2122, with each part 2101 having stepped block 2102(1) and 2102(2) having the stepped part facing towards trailer 108. Although only one part 2101 could be used to support trailer 108, the use of two separate parts 2101(1) and 2101(2) eliminates the possibility of trailer 108 twisting upon collapse. The following description applies to both parts 2101 of jackstand apparatus 2100.

Jackstand apparatus 2100 includes a baseplate 2104 that has a plurality of wheels 2106 aligned to run along tracks 2108. For example, wheels 2106 may be driven by an electric motor 2107 to move baseplate 2104 along track 2108 in order to position stepped block 2102 for trailers of different length. However, other components (e.g., hydraulic rams, screw mechanism, cables, belt, rack-and-pinion, and so on) may be used to move baseplate 2104 along tracks 2108. Although shown as wheels running on top of a track, other arrangements are envisaged that prevent the baseplate from becoming derailed from the tracks. Jackstand apparatus 2100 includes an extendable arm 2112 coupled at one end with stepped block 2102 and at the other end with baseplate 2104 via a post 2110. As shown in FIG. 23, each of tracks 2108(1) and 2108(2) is positioned on a different side of loading dock 2122 and running substantially parallel to trailer 108. As baseplate is driven along tracks 2108, post 2110 and extendable arm 2112 move stepped block 2102 in a direction substantially parallel to trailer 108 such that stepped block 2102 may be positioned at a front end of trailer 108, irrespective of the trailer's length. In certain embodiments, stepped block 2102 may include wheels/casters 2114 to facilitate maneuverability of stepped block 2102 by extendable arm 2112.

In certain embodiments, one or more sensors and/or encoders are included to determine a location of baseplate 2104 along tracks 2108. In one example, motor 2107 includes an encoder to measure movement of baseplate 2104. In another example, baseplate 2104 includes a horizontal laser/ultrasonic rangefinder that measures a distance between baseplate 2104 and dock 2122. In another example, a linear potentiometer is used to measure distance between baseplate 2104 and dock 2122. In another example, baseplate 2104 includes a camera for capturing images indicative of a distance between baseplate 2104 and dock 2122 and/or a position of baseplate 2104 with respect to a front end of trailer 108.

As shown in FIGS. 21-24, extendable arm 2112 may be implemented as a hydraulic piston; however, extendable arm 2112 may be implemented in other ways, including a scissor mechanism, a screw mechanism, and so on, without departing from the scope hereof. Extendable arm 2112 is extended to push stepped block 2102 beneath a corresponding side of trailer 108. Extendable arm 2112 is extended until a part of stepped block contacts a corresponding side of trailer 108. Stepped block 2102 prevents a front end of trailer 108 from collapse when the underside of the trailer contacts one of the steps of stepped block 2102. Each track 2108 is positioned between adjacent loading docks 2122 and may support at least two jackstands such that adjacent loading docks share the same track 2108.

One or more sensors may be used to ensure correct deployment of jackstand apparatus 2100. In one embodiment, a pressure sensor or a force sensor is coupled with stepped block 2102 to sense pressure of stepped block 2102 against a side of trailer 108. In another embodiment, pressure sensors are configured to sense pressure within a supply line to a lower chamber of a hydraulic cylinder within extendable arm 2112 that moves stepped block 2102 laterally, whereby an increase in pressure indicates contact of stepped block 2102 against the side of the trailer 108. In another embodiment, one or more inertial measurement units (IMU) and/or accelerometers are coupled with stepped block 2102 to sense when stepped block 2102 contacts the side of the trailer 108. In another embodiment, stepped block 2102 includes at least one limit switch that is depressed when stepped block 2102 presses against the side of the trailer 108. In another embodiment, jackstand apparatus 2100 includes at least one ultrasonic and/or laser range finder type sensor that measures a distance/range between stepped block 2102 and the side of trailer 108. In another embodiment, stepped block 2102 includes at least one inductive sensor that senses proximity of the side of trailer 108 when magnetic and/or ferrous. These sensors provide feedback that allows controller 106 to determine when jackstand apparatus 2100 is correctly deployed.

Swing Arm Deployment

Figure 25:
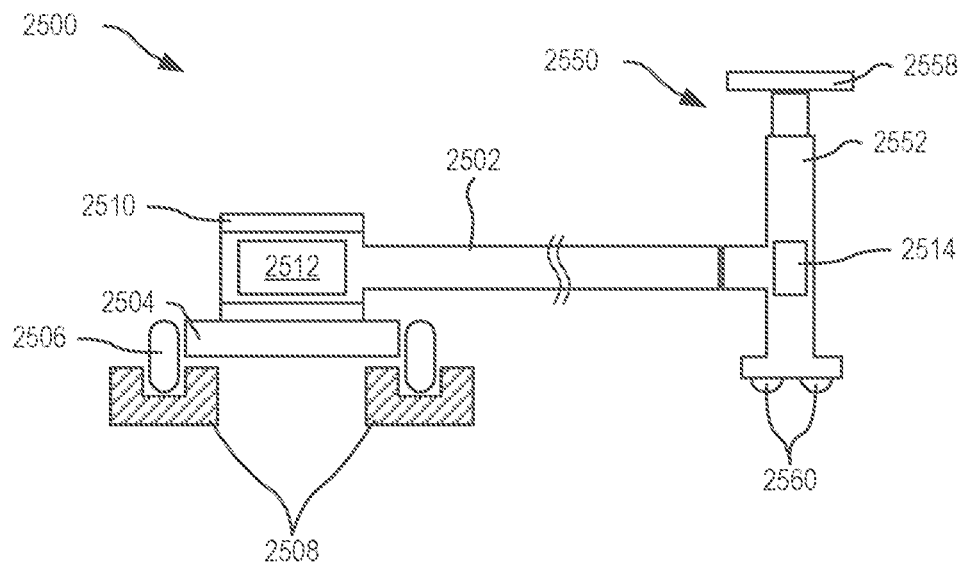
FIGS. 25-28 show one example jackstand apparatus with a swing arm for deploying a jackstand beneath a front end of a trailer, in embodiments.
Figure 26:
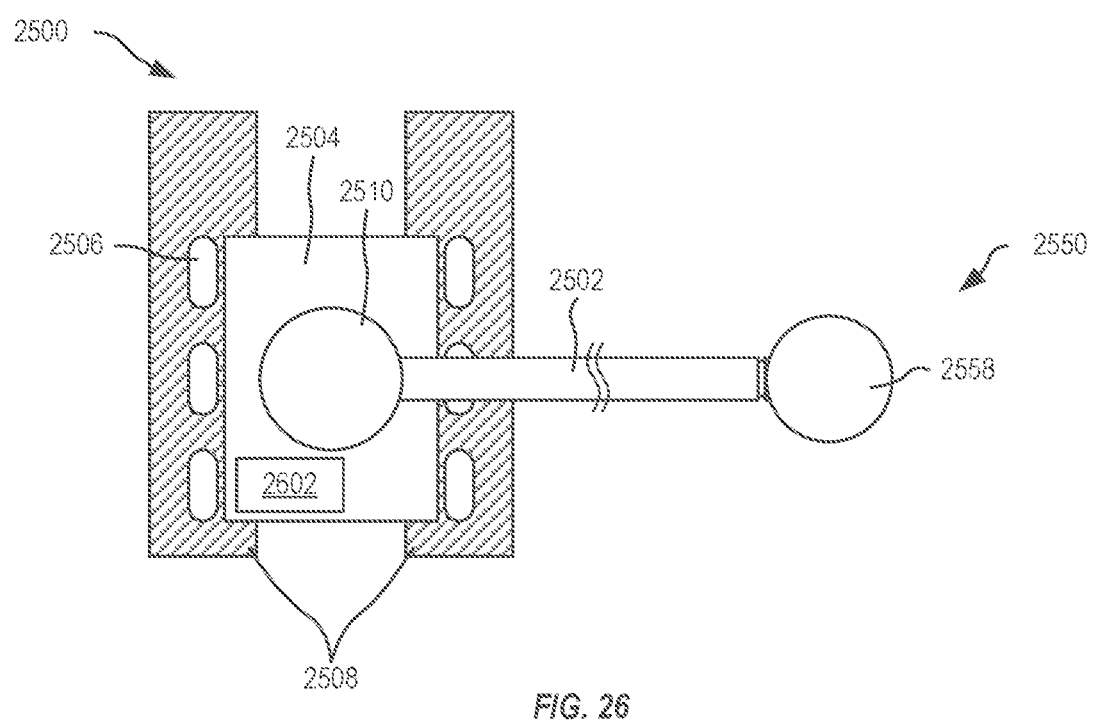
Figure 27:
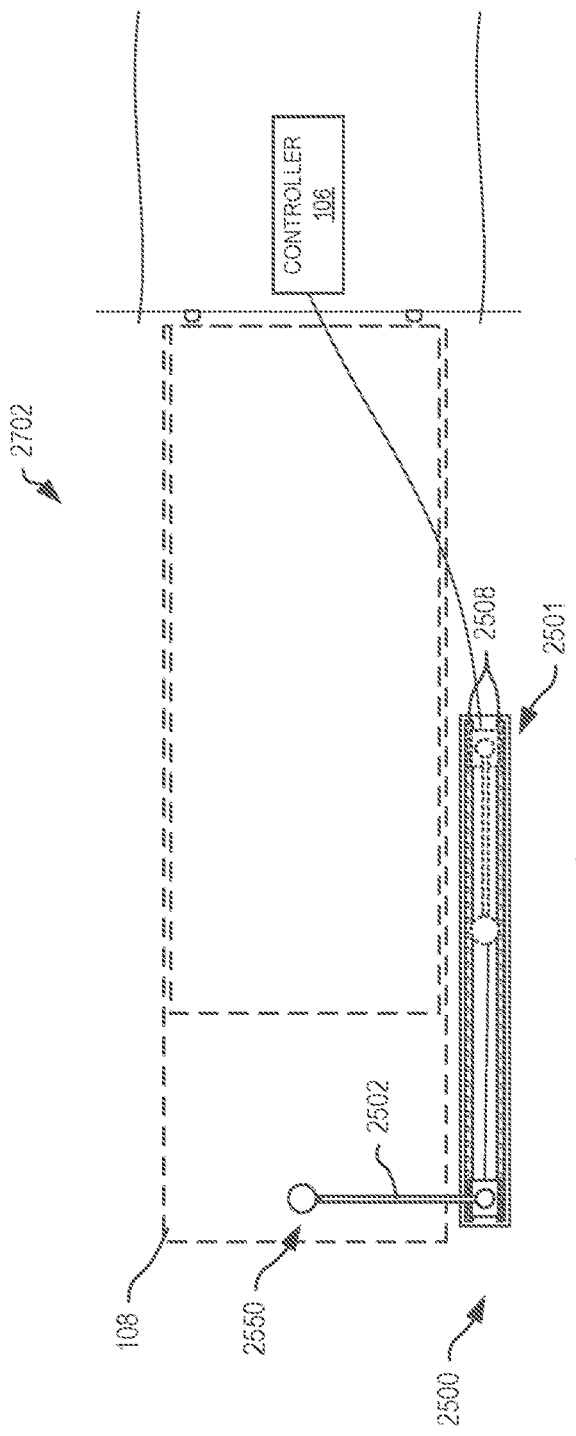
Figure 28:
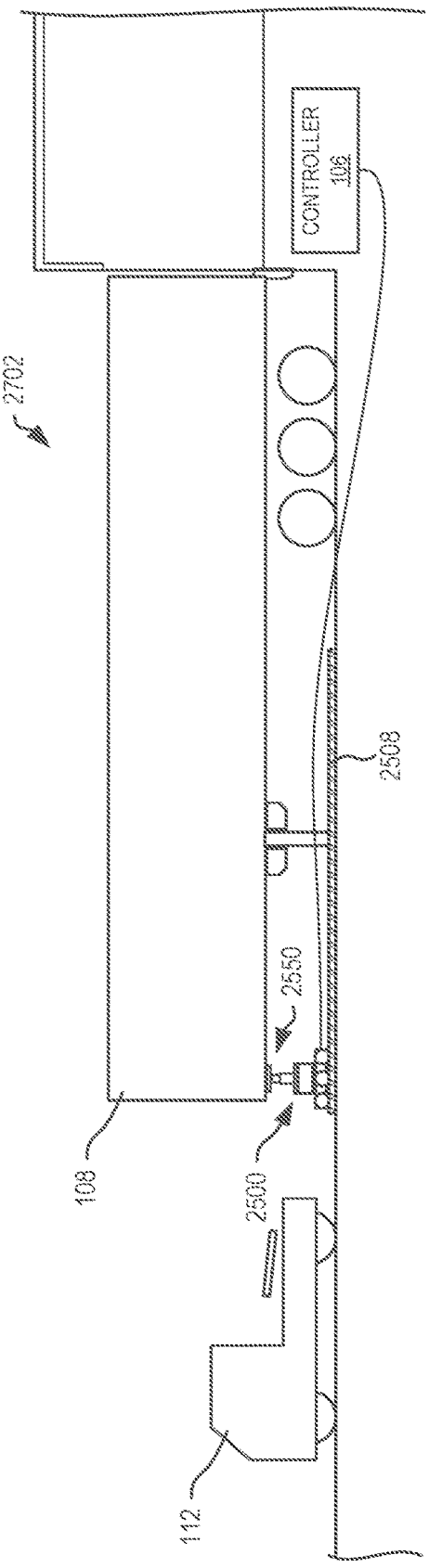

FIGS. 25-28 show one example jackstand apparatus 2500 with a swing arm 2502 for deploying a jackstand 2550 beneath a front end of trailer 108. In certain embodiments, jackstand 2550 is a conventional jackstand that is deployed by jackstand apparatus 2500. FIG. 25 is an end elevation showing jackstand apparatus 2500 with a swing arm 2502 deploying a jackstand 2550. FIG. 26 is a top view of jackstand apparatus 2500 of FIG. 25. FIG. 27 is a top view of a loading dock Jackstand apparatus 2500 includes a baseplate 2504 with a plurality of wheels 2506 aligned to run along tracks 2508. In certain embodiments, wheels 2506 are driven by an electric motor 2602 to move baseplate 2504 along track 2508 to accommodate trailers of different length. However, other components (e.g., hydraulic rams, screw mechanism, cables, belt, rack-and-pinion, and so on) may be used to move baseplate 2504 along tracks 2508. Although shown as wheels running on top of a track, other arrangements are envisaged for preventing the baseplate from becoming derailed from the tracks. A vertical post 2510 couples with baseplate 2504 and pivotably supports a first end of swing arm 2502. A motor 2512 is mechanically coupled with vertical post 2510 and swing arm 2502 is operable to rotate swing arm 2502 around vertical post 2510. A distal second end, opposite the first end, of swing arm 2502 couples with a jackstand 2550 that includes a vertical support 2552 and a jack pad 2558 attached at a top end of vertical support 2552. In certain embodiments, jackstand 2550 may include wheels/casters 2560 to facilitate movement of jackstand 2550 by swing arm 2502. Controller 106 controls baseplate 2504 and swing arm 2502 to position jackstand 2550 beneath a lower surface of a front end of trailer 108.

In certain embodiments, one or more sensors and/or encoders are included to determine a location of baseplate 2504 along tracks 2508. In one example, motor 2602 includes an encoder to measure movement of baseplate 2504. In another example, baseplate 2504 includes a horizontal laser/ultrasonic rangefinder that measures a distance between baseplate 2504 and dock 2702. In another example, a linear potentiometer is used to measure distance between baseplate 2504 and dock 2702. In another example, baseplate 2504 includes a camera for capturing images indicative of a distance between baseplate 2504 and dock 2702 and/or a position of baseplate 2504 with respect to a front end of trailer 108.

As shown in FIG. 27, track 2508 is located in an area adjacent loading dock 2702, and runs parallel to trailers positioned at loading dock 2702. Track 2508 may thus be positioned between adjacent loading docks in yard 104. Controller 106 controls the position of baseplate 2504 on track 2508, controls an angle of rotation of swing arm 2502 relative to baseplate 2504, and controls a motor 2514 that extends and retracts vertical support 2552. As shown in FIG. 27, dashed outline 2501 represents a "parked" position for jackstand apparatus 2500 that allows movement of trailer 108 to and from loading dock 2702.

In one example of operation, after yard tractor 112 has positioned trailer 108 at loading dock 2702 and decoupled therefrom, yard automation server 110 causes controller 106 to move baseplate 2504 to align with a front end of trailer 108, and then causes controller 106 to rotate swing arm 2502 to position jackstand 2550 beneath the front end of trailer 108, and to extend vertical support such that jack pad 2558 contacts the lower surface of the front end of trailer 108 and a bottom end of jackstand 2550 contact the ground. Thereby, jackstand 2550 provides additional support at the front end of trailer 108. When trailer is ready to depart from loading dock 2702, yard automation server 110 causes controller 106 to retract jackstand 2550, rotate swing arm 2502 relative to baseplate 2504 such that it is parallel to tracks 2508, and then move baseplate 2504 to an end of track 2508 (e.g., position of dashed outline 2501).

One or more sensors may be used to ensure correct deployment of jackstand 2550. In one embodiment, a pressure sensor or a force sensor is coupled with jack pad 2558 to sense pressure of jack pad 2558 against the bottom of trailer 108. In another embodiment, a current sensor measures current of motor 2514 that moves the jack pad 1608 upwards, whereby an increase in current indicates contact of jack pad 2558 against the bottom of trailer 108. In another embodiment, one or more inertial measurement units (IMU) and/or accelerometers are coupled with jack pad 2558 to sense when jack pad 2558 contacts the bottom of trailer 108. In another embodiment, jack pad 2558 includes at least one limit switch that is depressed when jack pad 2558 presses against the bottom of trailer 108. In another embodiment, jackstand 2550 includes at least one ultrasonic and/or laser range finder type sensor that measures a distance/range between jack pad 2558 and the bottom of trailer 108. In another embodiment, jack pad 2558 includes an inductive sensor that senses proximity of the bottom of trailer 108 when a fifth-wheel plate of trailer 108 is magnetic and/or ferrous. These sensors provide feedback that allows controller 106 to determine when jackstand 2550 is correctly deployed.

Post Mounted Jackstands

Figure 29:
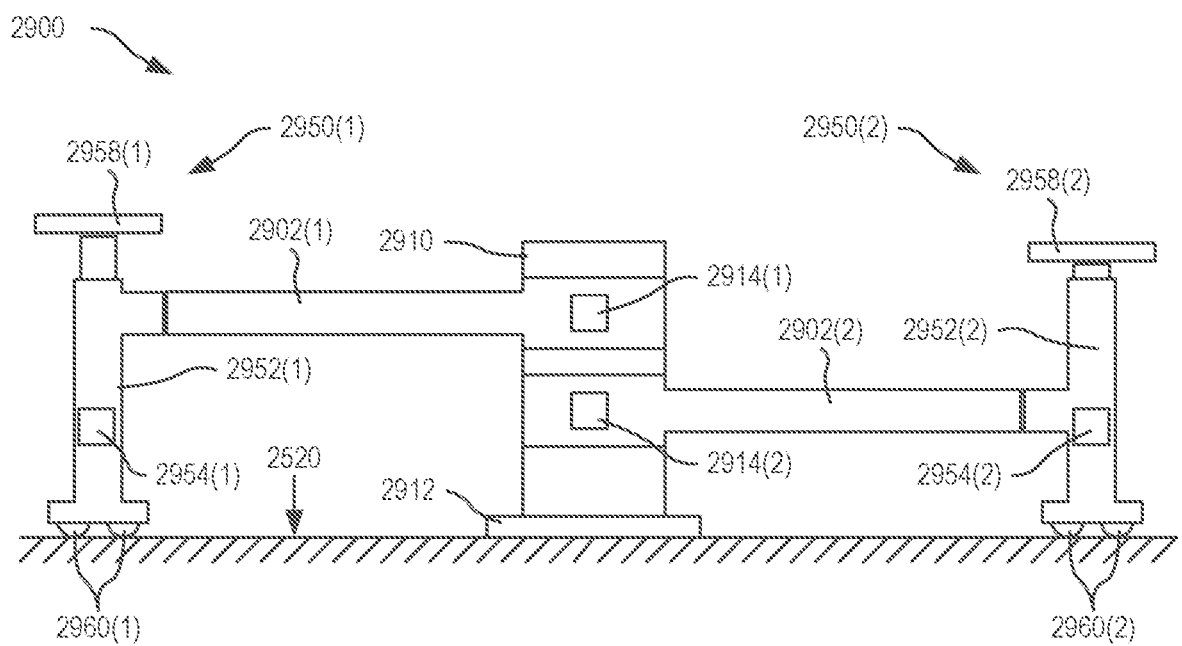
FIGS. 29-32 shows one example post mounted jackstand apparatus that includes a vertical post secured at ground level to support two rotatable arms that position and deploy a jackstand beneath a front end of trailer, in embodiments.
Figure 30:
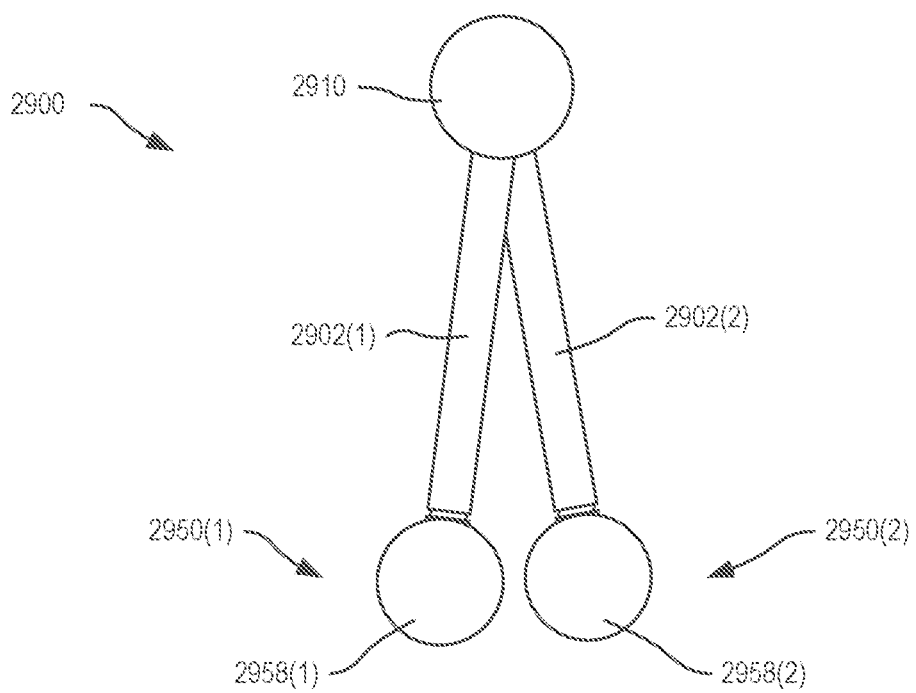
Figure 31:
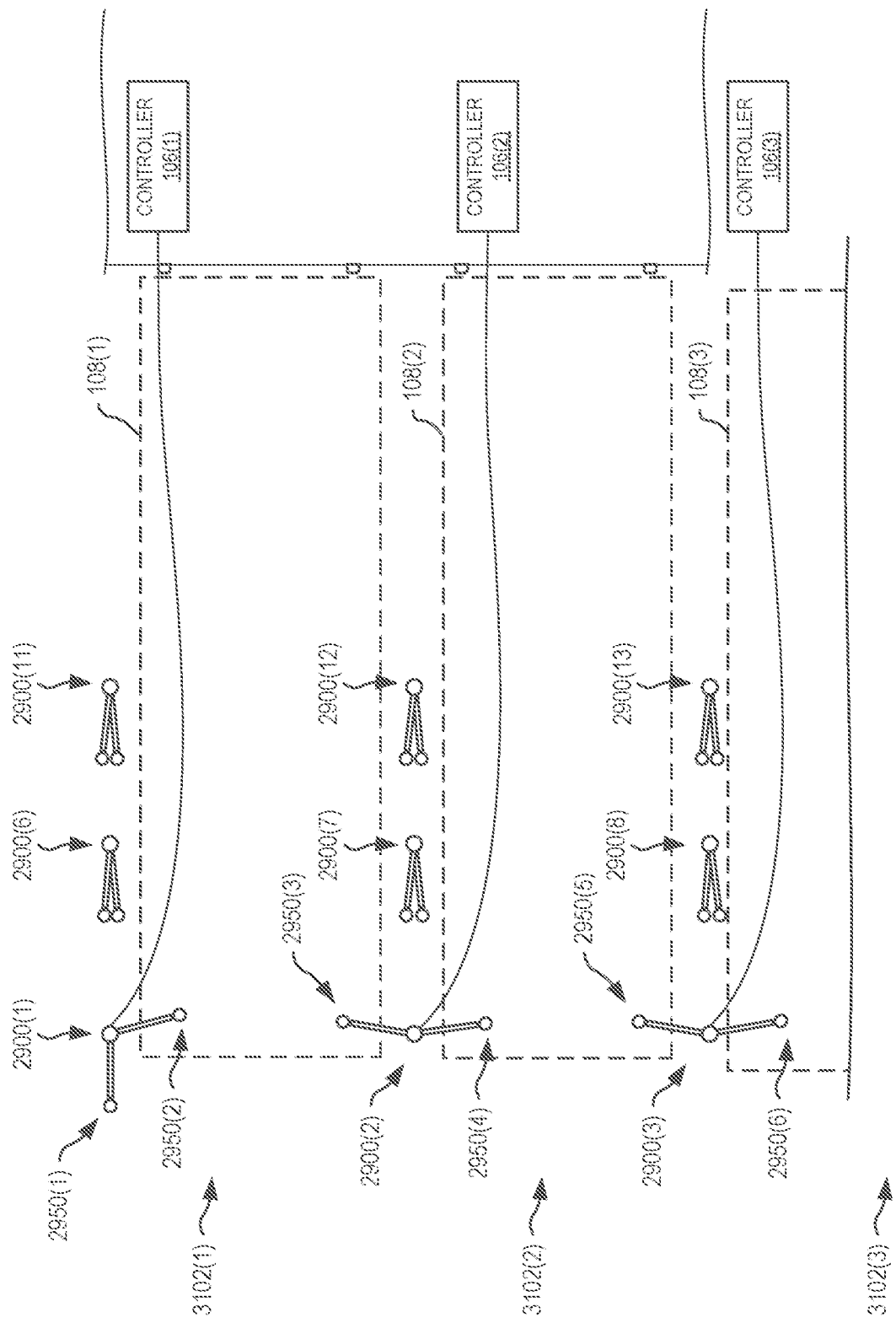
Figure 32:
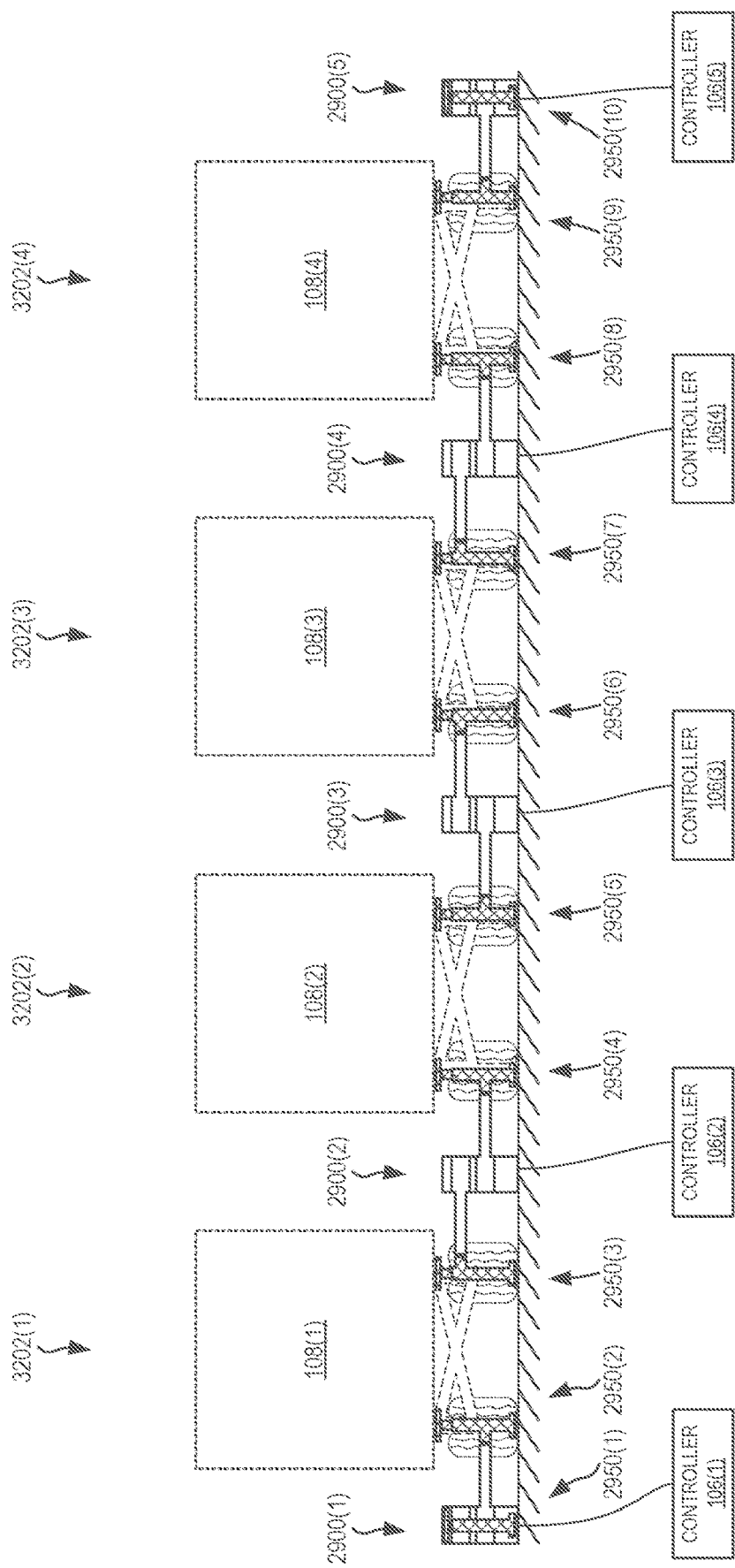

FIGS. 29-32 shows one example post mounted jackstand apparatus 2900 that includes a vertical post 2910 secured (e.g., using a flange 2912 that is bolted to concrete, etc.) at ground level 2520 to support two rotatable arms 2902 that position and deploy a jackstand beneath a front end of trailer 108. FIG. 29 is an end elevation of jackstand apparatus 2900 in a deployed position. FIG. 30 is a top view of jackstand apparatus 2900 in a parked position. FIG. 31 is a top view showing a plurality of jackstand apparatus 2900 positioned adjacent and between loading docks 3102(1) and 3102(2). FIG. 32 is an end elevation showing five jackstand apparatus 2900 supporting front ends of four trailers in four loading docks 3202. FIGS. 29-32 are best viewed together with the following description.

Vertical post 2910 is secured (e.g., using a flange 2912 that is bolted to concrete, etc.) at ground level 2520 to support two rotatable arms 2902, each having a motor 2914 that operates to rotate rotatable arm 2902 around vertical post 2910. In certain embodiments, flange 2912 is a baseplate similar to baseplate 502 of FIG. 5, that is repositionable using a handle and wheels. However, the baseplate is of sufficient mass to prevent movement of rotatable arms 2902 and jackstands 2950 from modifying a position of the baseplate. The baseplate may include a dense rubber matt affixed to a lower surface of the baseplate to provide better grip of a concrete surface (which may have micro grit/pebbles, etc.).

In certain embodiments, motor 2914 and/or rotatable arm 2902 includes an encoder for determining an angle of rotatable arm 2902. A distal end of each rotatable arm 2902 supports a jackstand 2950 formed as a vertical support 2952 coupled at a top end with a jack pad 2958. Vertical support 2952 is extendable (e.g., a hydraulic piston, screw mechanism, scissor mechanism, etc.) to press jack pad 2958 against a lower surface of a front end of trailer 108 and the ground, and thereby provides safety and support to trailer 108. In certain embodiments, jackstand 2950 includes wheels/casters 2960 to facilitate maneuverability of jackstand 2950 by rotatable arm 2902.

Controller 106 controls rotation of rotatable arm 2902 about vertical post 2910 and also controls extension and retraction of vertical support 2952. As shown in FIG. 31, by positioning each jackstand apparatus 2900 adjacent and/or between each loading dock 3102 and near an expected front end of trailer 108 when at the loading dock, jackstands 2950 may be deployed into none, either, or both of the adjacent loading docks. Although shown with two rotatable arms 2902, post 2910 may be fitted with only one rotatable arm 2902, such as when positioned adjacent to only one loading dock 3102. Using jackstand apparatus 2900(2) as an example, jackstand 2950(3) is rotated and positioned under a front corner of trailer 108(1) in loading dock 3102(1) and jackstand 2950(4) is rotated and positioned under a front corner of trailer 108(2) in loading dock 3102(2). Advantageously, deployment (e.g., rotation and extension) of jackstands 2950 are independently controlled and jackstands 2950 supporting a first trailer 108 may be retracted without affecting jackstands 2950 supporting other trailers.

One or more sensors may be used to ensure correct deployment of each jackstand 2950. In one embodiment, a pressure sensor or a force sensor is coupled with jack pad 2958 to sense pressure of jack pad 2958 against the bottom of trailer 108. In another embodiment, a current sensor measures current of motor 2954 that moves the jack pad 2958 upwards, whereby an increase in current indicates contact of jack pad 2958 against the bottom of trailer 108. In another embodiment, one or more IMUs and/or accelerometers are coupled with jack pad 2958 to sense when jack pad 2958 contacts the bottom of trailer 108. In another embodiment, jack pad 2958 includes at least one limit switch that is depressed when jack pad 2958 presses against the bottom of trailer 108. In another embodiment, jackstand 2550 includes at least one ultrasonic and/or laser range finder type sensor that measures a distance/range between jack pad 2958 and the bottom of trailer 108. In another embodiment, jack pad 2958 includes an inductive sensor that senses proximity of the bottom of trailer 108 when a fifth-wheel plate of trailer 108 is magnetic and/or ferrous. These sensors provide feedback that allows controller 106 to determine when jackstand 2550 is correctly deployed.

Tractor Deployed Jackstand

Figure 33:
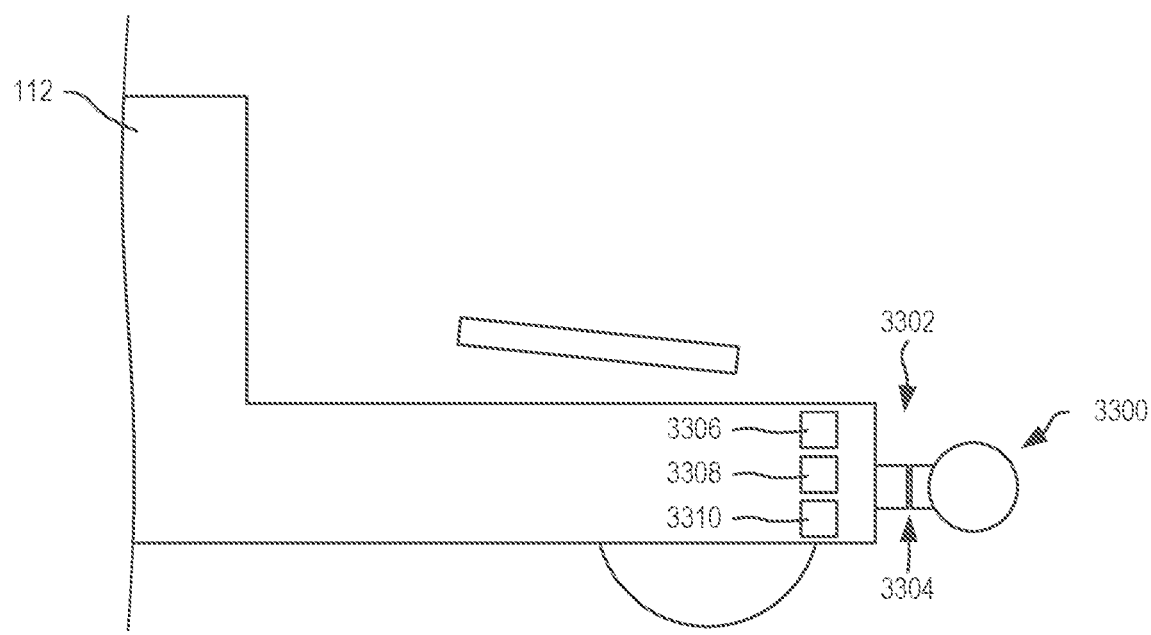
Figure 34:
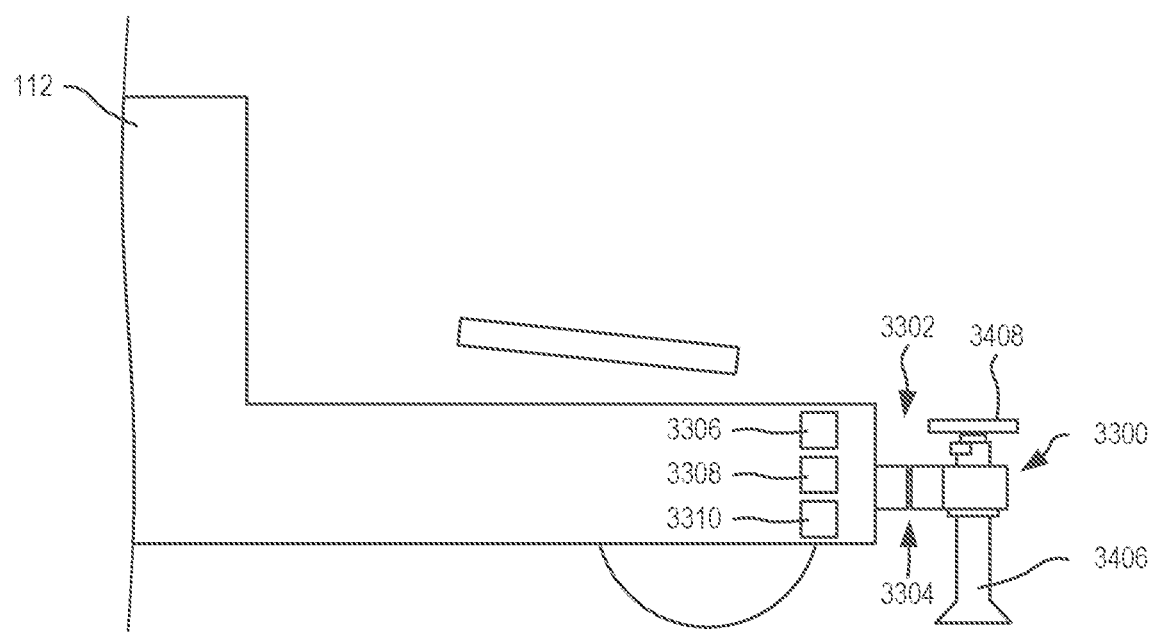
Figure 38:
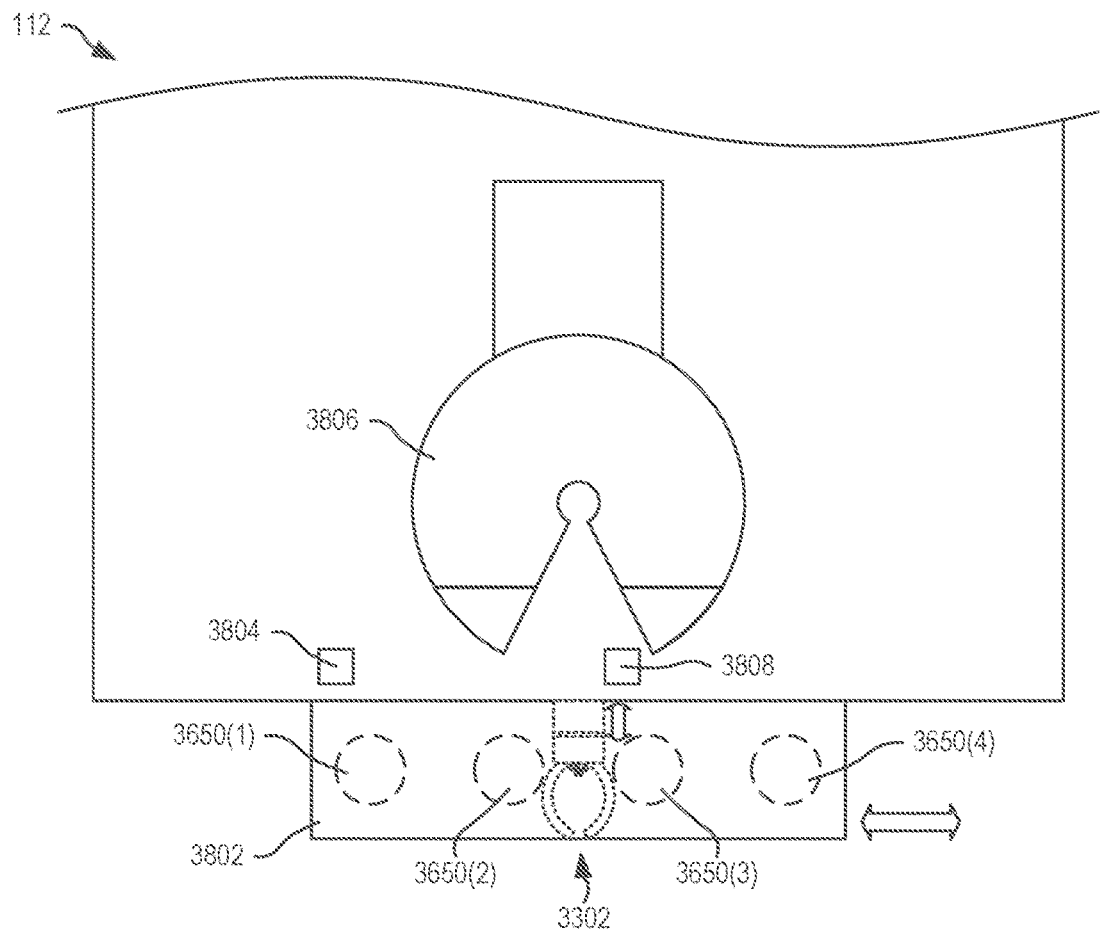
Figure 39:
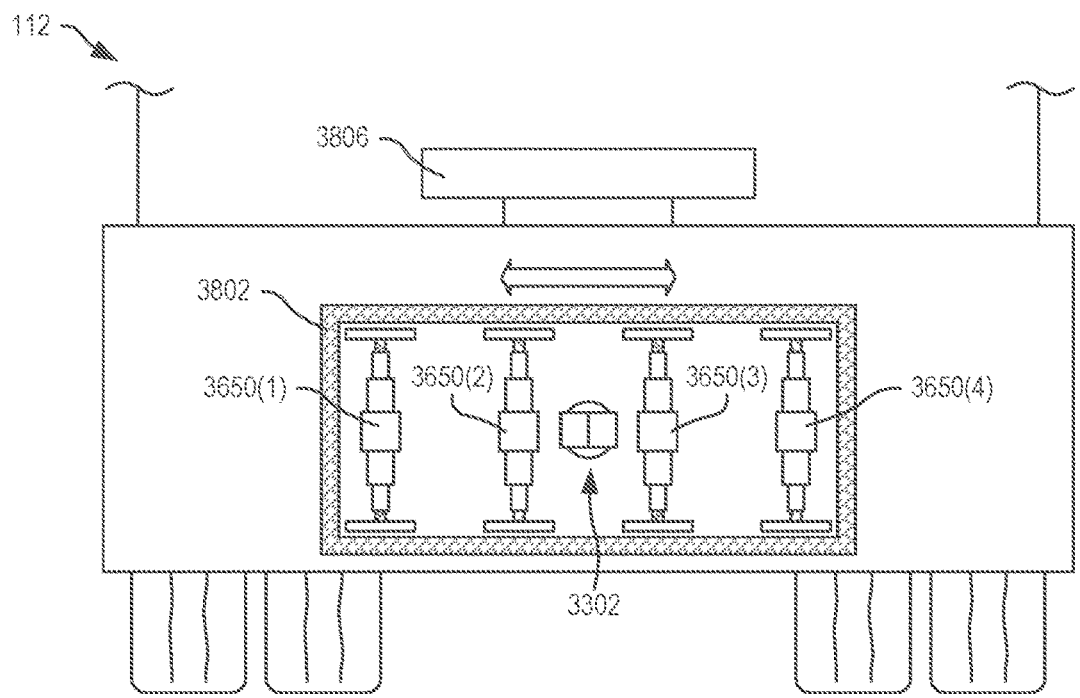

FIGS. 33-39 show one example jackstand 3300 that is deployable by a grabber 3302 of yard tractor 112. FIG. 33 is a side elevation illustrating a rear end of yard tractor 112 fitted with grabber 3302 that is carrying jackstand 3300 in a horizontal position. FIG. 34 is similar to FIG. 33, but with jackstand 3300 rotated to a vertical orientation. FIG. 35 is a top view showing grabber 3302 in further example detail. FIG. 36A shows jackstand 3300 in further example detail. FIG. 36B shows a second jackstand 3650 in further example detail. FIG. 37 shows jackstand 3300 deployed from yard tractor 112 to support trailer 108. FIGS. 33-37 are best viewed together with the following description. FIG. 38 is a top view showing a jackstand cassette 3802 attached to a back end of yard tractor 112 of FIG. 1. FIG. 39 is an end view of the jackstand cassette 3802 attached to the back end of yard tractor 112. FIGS. 33-39 are best viewed together with the following description.

Jackstand 3300 includes a vertical leg 3406 that is extendable and has a jack pad 3408 coupled to a top end thereof. A collar 3602 is positioned on vertical leg 3406 for coupling with grabber 3302. Collar 3602 may include a drive socket 3604 that, when turned, extends and retracts vertical leg 3406. Collar 3602 may also include a fiducial marker 3610 to facilitate alignment of grabber 3302 with jackstand 3300. For example, a camera 3508 mounted to grabber 3302 may capture one or more images of fiducial marker 3610 to facilitate alignment of grabber 3302 with jackstand 3300 when recoupling therewith. Grabber 3302 includes two retractable claws 3502 and 3504 that are sized to couple with, and secure, collar 3602. Retractable claws 3502 and 3504 are controlled by a motor 3306. In certain embodiments, grabber 3302 is movable (e.g., by a motor, not shown) in a vertical direction, relative to tractor 112, to facilitate coupling with, and positioning of, jackstand 3300. In certain embodiments, grabber 3302 is extendable and retractable (e.g., by motor 3808 of FIG. 38) in a horizontal direction, towards and away from tractor 112, to facilitate coupling with, and positioning of, jackstand 3300.

Grabber 3302 also includes a drive bit 3506 that is sized and shaped to mechanically engage with drive socket 3604 (e.g., when retractable claws 3502 and 3504 are securely coupled with collar 3602). Drive bit 3506 is independently driven by a motor 3308 to extend and retract vertical leg 3406. Grabber 3302 is rotatable at joint 3304 by a motor 3310 to rotate jackstand 3300 to a horizontal orientation to reduce risk of damage when carried by yard tractor 112. FIG. 36B shows a second jackstand 3650 that includes collar 3652, positioned between two opposed extendable legs 3656(1) and 3656(2), for coupling with grabber 3302, a jack pad 3658 positioned at a top end of extendable leg 3656(1) and a foot pad 3662 positioned at a bottom end of extendable leg 365633(2). Collar 3652 includes a drive socket 3654 that, when turned by drive bit 3506 of grabber 3302, simultaneously extends, or retracts depending upon direction, extendable legs 3656(1) and 3656(2). Collar 3652 may also include a fiducial marker 3660 to facilitate alignment of grabber 3302 with jackstand 3650. Advantageously, jackstand 3650 may be carried by yard tractor 112, while held by grabber 3302 in a vertically orientation, since extendable leg 3656(2), when retracted, lifts foot pad 3662 off the ground.

In one example of operation, jackstand 3300 is carried in a horizontal position, as shown in FIG. 33, by yard tractor 112 while yard tractor 112 is coupled with trailer 108. For example, jackstand 3300 is carried as yard tractor 112 maneuvers trailer 108 into loading dock 3702. Yard tractor 112 then decouples from trailer 108, leaving trailer 108 standing on its landing gear 3704, and begins to move forward, stopping with jackstand 3300 positioned beneath the front end of trailer 108. Yard tractor 112 then rotates grabber 3302 at joint 3304 to rotate jackstand 3300 to a vertical position. Yard tractor 112 rotates drive bit 3506 to extend vertical leg 3406 until jackstand 3300 provides support to trailer 108 from the ground. Yard tractor 112 then retracts claws 3502 and 3504 to release jackstand 3300, and moves forward leaving jackstand 3300 in place. This process is reversed for yard tractor 112 to recouple with trailer 108, collecting and stowing jackstand 3300 at the rear of yard tractor 112.

In certain embodiments, unused jackstands 3300 may be stored at a repository (e.g., a designated location with the yard for storing jackstands 3300), whereby yard tractor 112 may retrieve each jackstand 3300 as needed, such as when successive operations of yard tractor 112 position trailer 108 at a dock and deploy jackstand 3300, and deposit jackstand 3300 when not needed, such as when successive operations of yard tractor 112 retrieve jackstand 3300 and move trailer 108 away from a dock. Yard tractor 112 may track the position of each jackstand 3300 within the repository and is thereby aware of which specific locations within the repository contain an unused jackstand. In certain embodiments, yard automation server 110 tracks jackstands 3300 within the repository and directs yard tractor 112 to retrieve and deposit jackstands 3300 as needed.

In certain embodiments, as shown in FIGS. 38 and 39, a rear end of yard tractor 112 (shown with a fifth-wheel 3806) is fitted with a jackstand cassette 3802 that slides horizontally, under control of a motor 3804 to position a jackstand 3650 in front of grabber 3302 as needed. Grabber 3302 is retractable by a motor 3808 into yard tractor 112 to allow cassette 3802 to slide horizontally, and is extended by motor 3808 to engage (grab) jackstand 3650 positioned in front of grabber 3302. Motor 3808 may then extend grabber 3302 further from yard tractor 112 to deploy jackstand 3650 as described above. Similarly, grabber 3302 may be controlled to position and release jackstand 3650 within an empty slot of jackstand cassette 3802. Jackstand cassette 3802 may then slide horizontally to move the released jackstand 3650 away from grabber 3302, thereby allowing grabber 3302 to retrieve a deployed jackstand 3650. In the example of FIGS. 38 and 39, jackstand cassette 3802 is shown storing four jackstands 3650(1)-(4), but may be configured to store more or fewer jackstands without departing from the scope hereof. Advantageously, jackstand cassette 3802 allows to yard tractor 112 to perform multiple consecutive jackstand deployments and multiple jackstand retrievals without having to fetch or deposit the jackstands within a designated repository within the yard until the storage of jackstand cassette 3802 is exhausted.

Embedded Scissor Jacks

Figure 40:
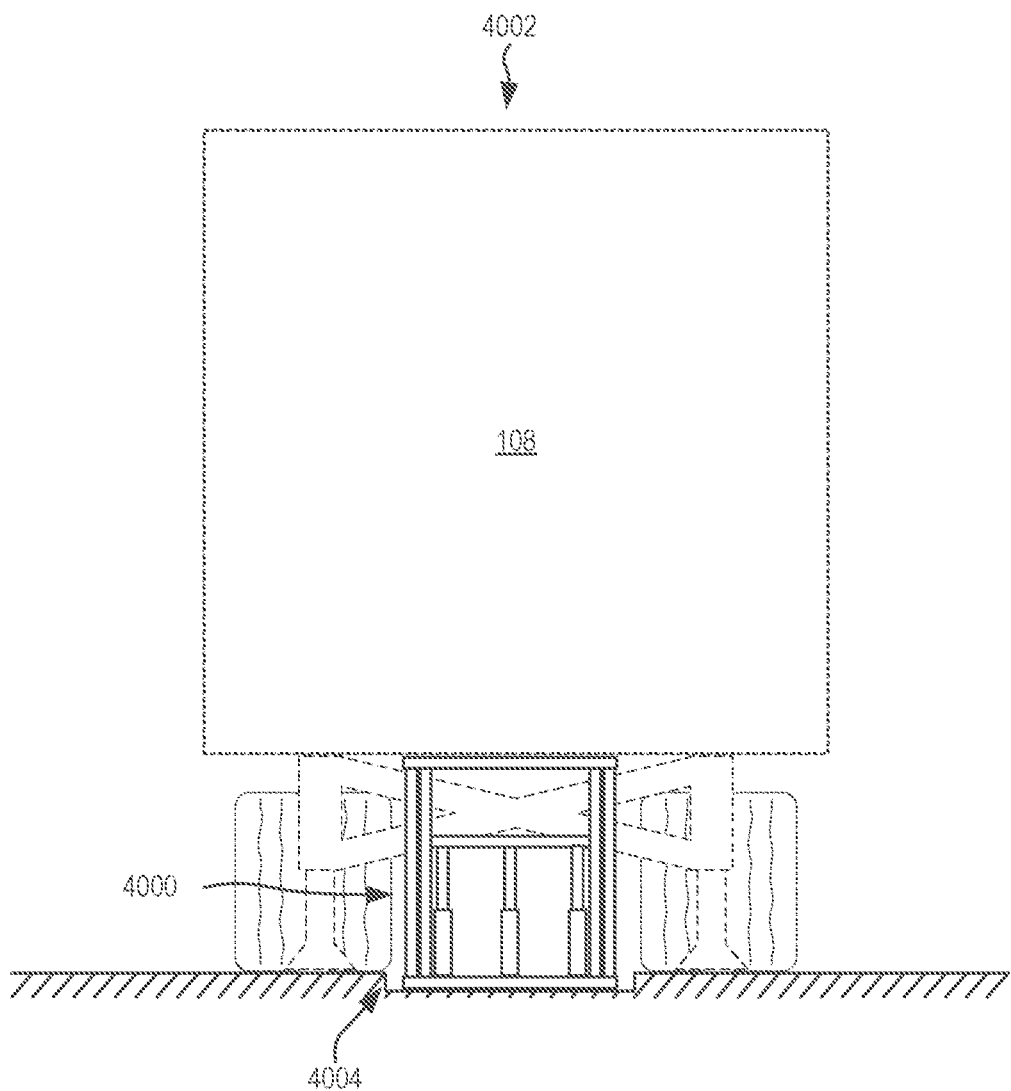
FIGS. 40-42 show one example scissor jackstand installed in a recess in the ground and autonomously deployed to provide support to a front end of a trailer at a loading dock, in embodiments.
Figure 41:
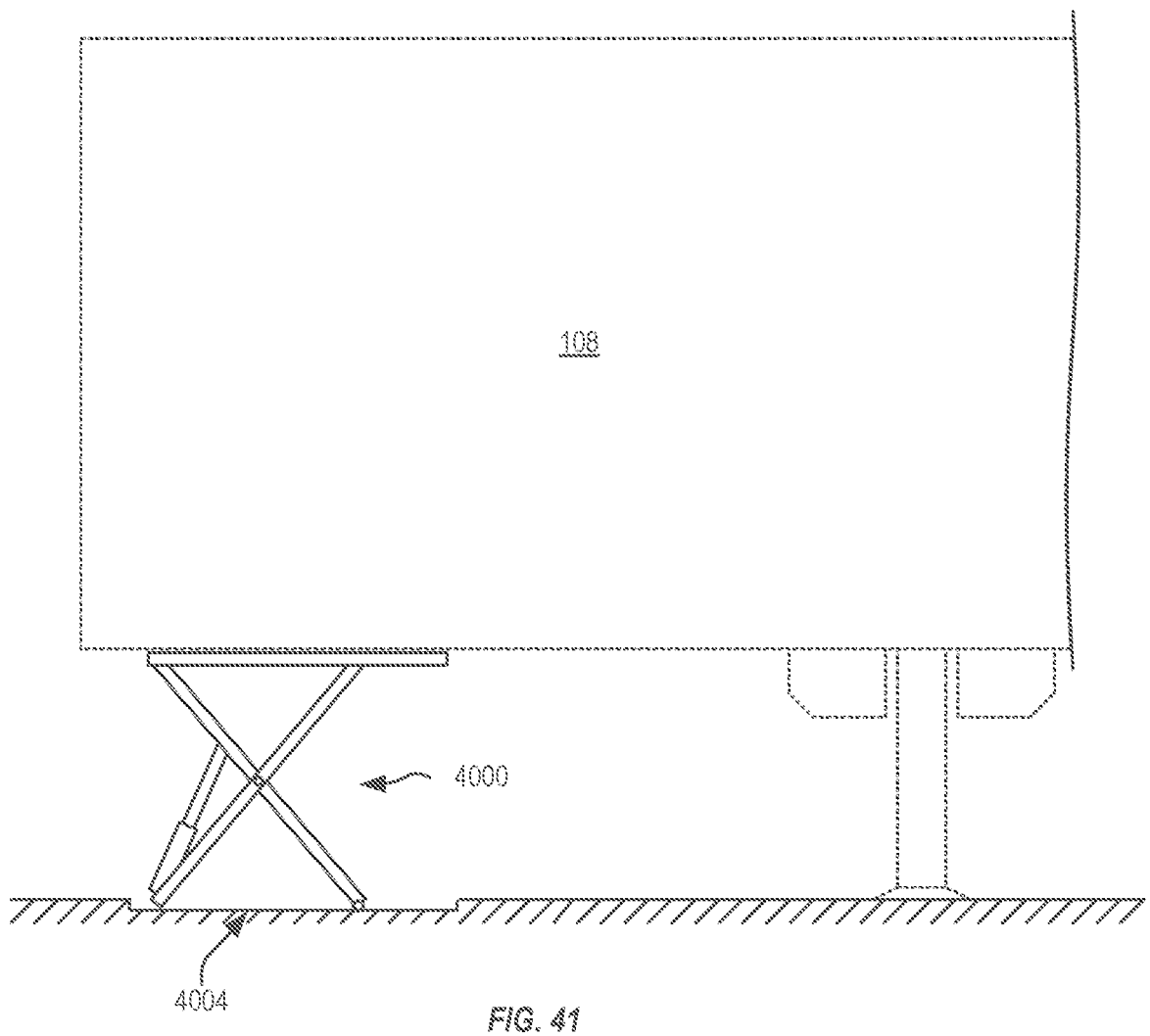
Figure 42:
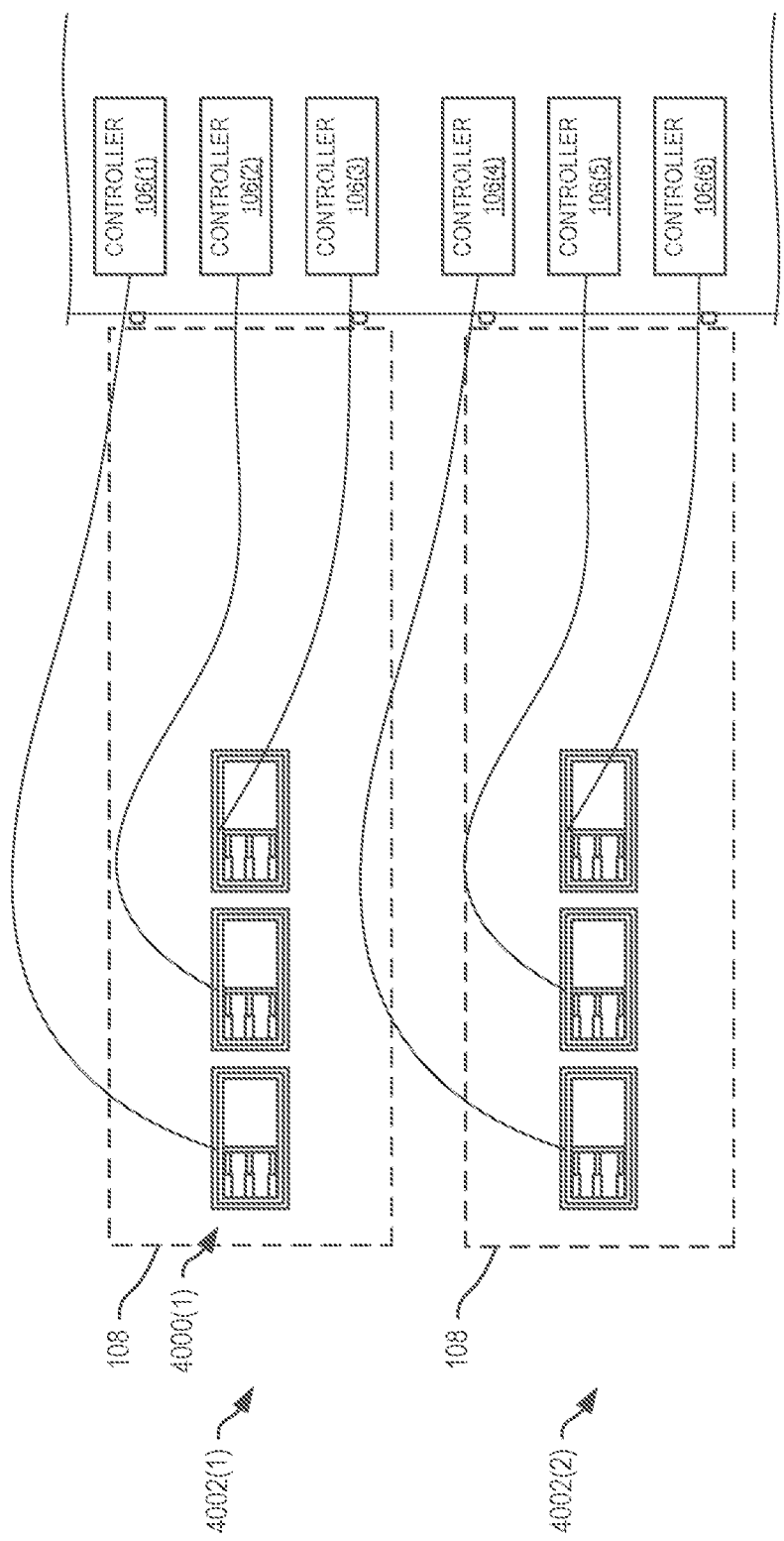

FIGS. 40-42 show one example scissor jackstand 4000 that may be installed in a recess 4004 in the ground and autonomously deployed to provide support to a front end of trailer 108 at a loading dock 4002. FIG. 40 is an end elevation showing scissor jackstand 4000 supporting a front end of trailer 108. FIG. 41 is a side elevation showing scissor jackstand 4000 supporting the front end of trailer 108. FIG. 42 is a top view showing a plurality of scissor jackstands 4000 embedded into the ground at strategic positions to support front ends of trailers of different lengths. FIGS. 40-42 are best viewed together with the following description.

Scissor jackstand 4000 is substantially flat when retracted. In certain embodiments, scissor jackstand may be position on the ground. However, in certain embodiments, scissor jackstand 4000 is positioned in a substantially flat recess in the ground such that scissor jackstand does not significantly protrude above ground level when retracted. Advantageously, when retracted, scissor jackstand 4000 provides no ground clearance issues as trailer 108 is maneuvered in and out of loading dock 4002.

Scissor jackstand 4000 is activated by controller 106 and may be autonomously controlled by yard automation server 110. For example, yard automation server 110 may deploy a particular one of scissor jackstands 4000 based on knowledge of trailer movement.

Deployment Mechanisms

Figure 43:
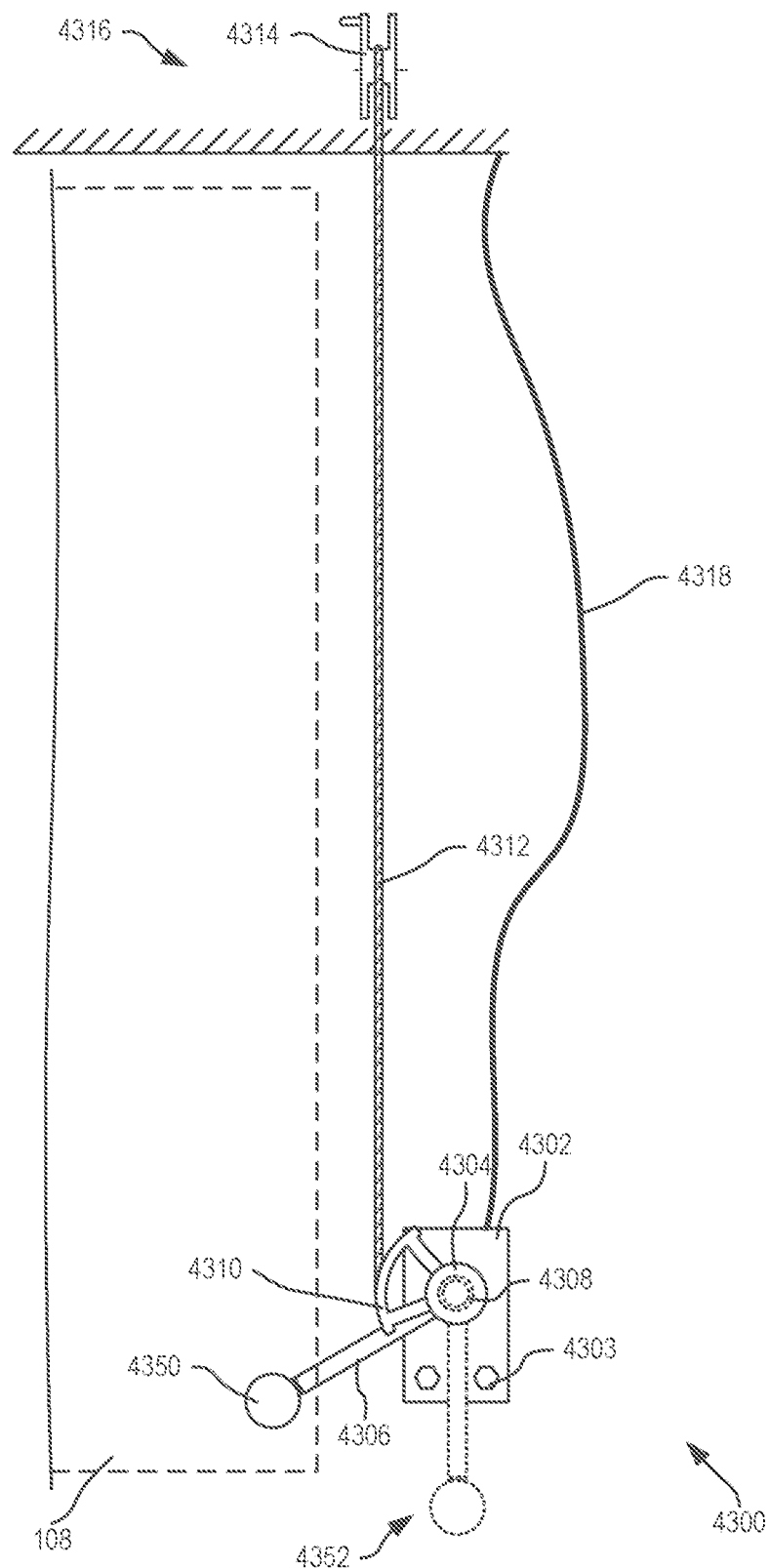
FIG. 43 shows one example jackstand apparatus with cable deployment mechanism that rotates a jackstand from a resting position to beneath a front end of a trailer, in embodiments.

FIG. 43 shows one example jackstand apparatus 4300 with a cable deployment mechanism that rotates a jackstand 4350 from a resting position 4352 to beneath a front end of a trailer. Jackstand apparatus 4300 includes a plate 4302 that mounts flush to the ground (e.g., a concrete pad) using at least one fastener 4303 (e.g., a bolt), a post 4304 mounted to plate 4302 that rotatably supports a swing arm 4306 with a jackstand 4350 at a distal end. Post 4304 includes a return spring 4308 that provides a mechanical force to return swing arm 4306 and jackstand 4350 to a resting position 4352. A radiused cable guide 4310 is mechanically coupled with a rotatable portion of post 4304 and/or with swing arm 4306. A cable 4312 is attached at a first end to radiused cable guide 4310 and at a second end to a manual actuator 4314 (e.g., a ratcheted lever or cable wheel), which may be positioned within a building (e.g., warehouse) of a loading dock 4316.

In one example of operation, an operator uses actuator 4314 to pull cable 4312, causing swing arm 4306 to rotate about post 4304, compressing return spring 4308, and to position jackstand 4350 beneath a front end of trailer 108 at the loading dock. To retract jackstand 4350, the operator releases actuator 4314, thereby releasing cable 4312, and allowing return spring 4308 to move swing arm 4306 and jackstand 4350 back towards resting position 4352. Jackstand apparatus 4300 is easily installed, requiring only that plate be fixed to the ground at a position near a front end of trailer 108, and that actuator 4314 be secured at a convenient location for manual operation. Although shown with resting position 4352 being located further away from the actuator 4314 (e.g., the warehouse) than post 4304, jackstand apparatus 4300 may be configured to have resting position 4352 located in the opposite orientation (e.g., 180 degrees opposed) from post 4304, and with cable 4312 and radiused cable guide 4310 also reversed, such that swing arm 4306 rotates in the opposite direction and away from actuator 4314 (e.g., the warehouse) without departing from the scope hereof. Advantageously, this may reduce the extent to which jackstand apparatus 4300 extends outward from dock 4316.

Jackstand 4350 may be similar to either or both of jackstands 2550 of FIG. 25 and 2950 of FIG. 29, and include a motor that extends and retracts a vertical support of jackstand 4350, whereby jackstand apparatus 4300 may include an electrical cable 4318 to support power and/or control signals to jackstand 4350, and thereby allow remote operation of jackstand 4350.

Figure 44:
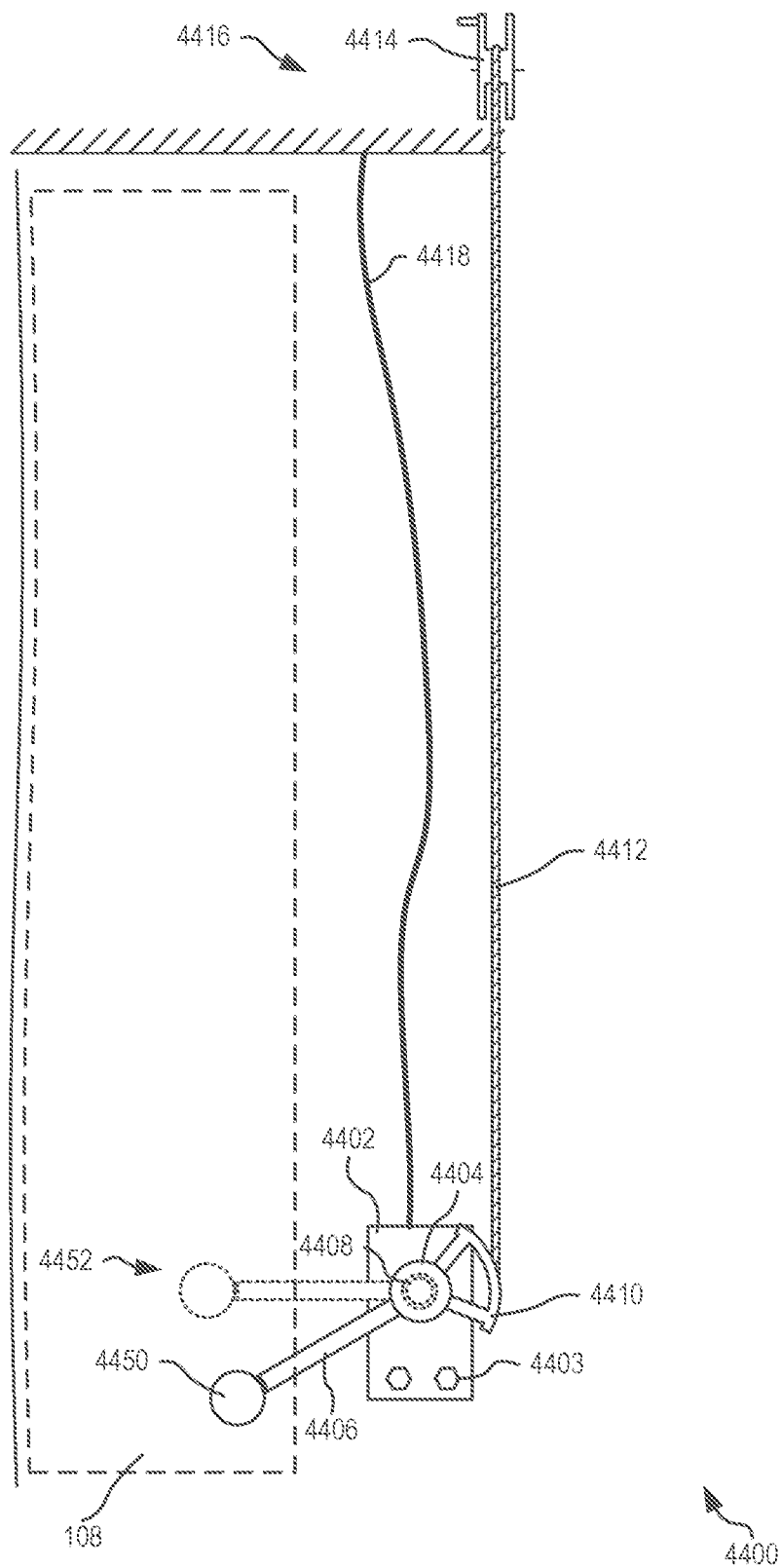
FIG. 44 shows one example jackstand apparatus with a cable retrieval mechanism that rotates a jackstand from beneath a front end of a trailer to a resting position away from the trailer, in embodiments.

FIG. 44 shows one example jackstand apparatus 4400 with a cable retrieval mechanism that rotates a jackstand 4450 from beneath a front end of a trailer to a resting position away from the trailer. Jackstand apparatus 4400 is similar to jackstand apparatus 4300 of FIG. 43, but with reversed operation. Jackstand apparatus 4400 includes a plate 4402 that mounts flush to the ground (e.g., a concrete pad) using at least one fastener 4403 (e.g., a bolt), a post 4404 mounted to plate 4402 that rotatably supports a swing arm 4406 with a jackstand 4450 at a distal end. Post 4404 includes a return spring 4408 that provides a mechanical force to return swing arm 4406 and jackstand 4450 to a resting position 4452. A radiused cable guide 4410 is mechanically coupled with a rotatable portion of post 4304 and/or with swing arm 4406. A cable 4412 is attached at a first end to radiused cable guide 4410 and at a second end to a manual actuator 4414 (e.g., a ratcheted lever or cable wheel), which may be positioned within a building (e.g., warehouse) of a loading dock 4416.

In one example of operation, an operator uses actuator 4414 to pull cable 4412, causing swing arm 4406 to rotate about post 4404, compressing return spring 4408, and to position jackstand 4450 away from a front end of trailer 108 at the loading dock. To position jackstand 4450 beneath the front end of trailer 108, the operator releases actuator 4414, thereby releasing cable 4412, and allowing return spring 4408 to move swing arm 4406 and jackstand 4450 back towards resting position 4452, and thereby beneath the front end of trailer 108. Jackstand apparatus 4400 is easily installed, requiring only that plate be fixed to the ground at a position near a front end of trailer 108, and that actuator 4414 be secured at a convenient location for manual operation. Although shown with swing arm 4406 rotating away from actuator 4414 (e.g., the warehouse) when moving from resting position 4452, cable 4412 and radiused cable guide 4410 may be reversed such that swing arm 4406 rotates towards actuator 4414 (e.g., warehouse) without departing from the scope hereof. Advantageously, this may reduce the extent to which jackstand apparatus 4400 extends outward from dock 4416.

Jackstand 4450 may be similar to either or both of jackstands 2550 of FIG. 25 and 2950 of FIG. 29 and includes a motor that extends and retracts a vertical support of jackstand 4450, whereby jackstand apparatus 4400 may include an electrical cable 4418 to supply power and/or control signals to jackstand 4450, and thereby allow remote operation of jackstand 4450.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween. For example, features may be combined as follows:

Combination of Features (A1) An automated jackstand system supports a front end of a trailer parked at a loading dock. The automated jackstand system includes: a jackstand, having: a jack pad; a vertically extendable component coupling at a first end with the jack pad; a collar positioned on the vertically extendable component; and a mechanical socket positioned on the collar and mechanically geared to extend the vertically extendable component when rotated in a first direction and to retract the vertically extendable component when rotated in a second direction opposite the first direction. The automated jackstand system also includes a grabber positioned at a back end of a yard tractor and having: at least two claws operable by a first motor to removably couple with the collar; and a drive bit operable by a second motor and shaped and sized to mechanically couple with the mechanical socket, wherein the drive bit is positioned between the at least two claws. The automated jackstand system also includes a controller, having machine-readable instructions stored in non-transitory memory that, when executed by a processor, control the first motor and the second motor to deploy the jackstand to support the front end of the trailer.

(A2) The embodiment (A1) further including: a fiducial marking positioned on the collar; a camera positioned on the yard tractor for imaging the fiducial marking; and further machine-readable instructions stored in the non-transitory memory that, when executed by the processor, control the yard tractor to align the grabber with the fiducial marking when coupling with the jackstand.

(A3) In either of the embodiments (A1) or (A2), the vertically extendable component having a first portion extendable in a first vertical direction to move the jack pad upwards to press against a bottom surface of the front end of the trailer.

(A4) Any of the embodiments (A1)-(A3) further including a foot pad coupled with a second extendable portion of the vertically extendable component, the second extendable portion being extendable in a second vertical direction, opposite to the first vertical direction, to press the foot pad against the ground.

(A5) Any of the embodiments (A1)-(A4) further including a third motor operable to move the grabber in a vertical direction relative to the yard tractor.

(A6) Any of the embodiments (A1)-(A5) further including a third motor for extending the grabber in a horizontal direction.

(A7) Any of the embodiments (A1)-(A6) further including a jackstand cassette positioned at the back end of the yard tractor for storing the jackstand when at least one undeployed, the jackstand cassette being operable to move horizontally to position the jackstand in front of the grabber.

(B1) A jackstand includes a jack pad, a vertically extendable component coupling at a first end with the jack pad, a collar positioned on the vertically extendable component, a fiducial marking positioned on the collar in a location for imaging by an imager located external to the jackstand, and a mechanical socket positioned on the collar and mechanically geared to extend the vertically extendable component when rotated in a first direction and to retract the vertically extendable component when rotated in a second direction opposite the first direction.

(B2) In the embodiment (B1), the vertically extendable component having a first portion extendable in a first vertical direction to move the jack pad upwards to press against a bottom surface of the front end of the trailer.

(B3) Either of the embodiments (B1) or (B2) further including a foot pad coupled with a second extendable portion of the vertically extendable component, the second extendable portion being extendable in a second vertical direction, opposite to the first vertical direction, to press the foot pad against the ground.

(B4) In any of the embodiments (B1)-(B3), the jackstand sized and shaped to fit within a jackstand cassette located on a tractor.

(C1) An automated jackstand supports a front end of a trailer parked at a loading dock. The automated jackstand including: a baseplate; a vertical support coupled to the baseplate by a pivot positioned at a lower end of the vertical support; a jack pad positioned at a top end of the vertical support; an actuator positioned at the baseplate to generate a linear motion parallel to the baseplate; an arm having a first end pivotably coupled to the vertical support and a second end pivotably coupled to the actuator; and wherein the linear motion causes the arm to move the vertical support between a horizontal position and a vertical position.

(C2) The embodiment (C1) further including: at least two wheels positioned at a first plate end of the baseplate; a handle positioned at a second plate end, opposite the first plate end, of the baseplate; and wherein the at least two wheels support the baseplate only when the handle is lifted and the baseplate is at an angle relative to the ground.

(C3) Either of the embodiments (C1) or (C2) further including: a plurality of wheels coupled with the baseplate and aligned to run on tracks positioned at or below ground level within loading dock; and a drive motor for moving the automated jackstand along the tracks.

(C4) Any of the embodiments (C1)-(C3) further including at least one of a sensor and an encoder for determining a position of the automated jackstand along the tracks.

(C5) In any of the embodiments (C1)-(C4), the drive motor is controllable by a remote controller operable to position the automated jackstand beneath the front end of the trailer based on the determined position.

(C6) In any of the embodiments (C1)-(C5), the actuator including a hydraulic piston.

(C7) In any of the embodiments (C1)-(C6), the actuator including a motor driven screw mechanism.

(C8) In any of the embodiments (C1)-(C7), the actuator is remotely controlled by a controller.

(C9) In any of the embodiments (C1)-(C8), the actuator is remotely controlled by a person.

(D1) An automated jackstand system supports a trailer parked at a loading dock. The automated jackstand system including: a stepped block; a horizontally extendable component coupling at a first end with the stepped block; and a controller for remotely extending the horizontally extendable component to press the stepped block against a first side surface at a front end of the trailer.

(D2) The embodiment (D1) further including: a track aligned with a length of the trailer and adjacent to a trailer parking area of the loading dock; a baseplate having a plurality of wheels aligned with the track, the baseplate supporting the horizontally extendable component; and a motor coupled to drive at least one wheels to position the baseplate along the track.

(E1) An automated jackstand system supports a trailer parked at a loading dock. The automated jackstand system includes: a jack pad; a vertically extendable component coupling at a first end with the jack pad; and a controller for remotely extending the vertically extendable component to press the jack pad against a lower surface of a front end of the trailer.

(E2) In the embodiment (E1), the vertically extendable component including a hydraulic piston that is at least partially embedded into the ground.

(E3) In either of the embodiments (E1) or (E2), the vertically extendable component including a scissor mechanism that is at least partially embedded into the ground.

(E4) In any of the embodiments (E1)-(E3), the vertically extendable component including a screw mechanism that is at least partially embedded into the ground.

(E5) In any of the embodiments (E1)-(E4), the jack pad including one of a horizontal disc and a horizontal beam.

(E6) Any of the embodiments (E1)-(E5), further including at least one sensor for sending feedback indicative of correct deployment of the automated jackstand system to the controller.

(E7) Any of the embodiments (E1)-(E6), further including a track aligned with a length of the trailer and positioned centrally within a trailer parking area of the loading dock; a baseplate having a plurality of wheels aligned with the track, the baseplate supporting the vertically extendable component; and a motor coupled to drive at least one wheels to position the baseplate along the track.

(F1) An automated jackstand system supports a front end of a trailer parked at a loading dock. The automated jackstand system includes: a vertical post; a swing arm supported at one end by the vertical post; a first motor mechanically coupled with the vertical post and the swing arm, the first motor being operable to rotate the swing arm about the vertical post; a jackstand coupled with a distal end of the swing arm; and a second motor operable to extend and retract a vertical support of the jackstand.

(F2) The embodiment (F1) further including a controller for controlling operation of the first motor to position the jackstand beneath the front end of the trailer, and for controlling the second motor to extend the vertical support of the jackstand to support the front end of the trailer.

(F3) Either of the embodiments (F1) or (F2) further including: a track aligned with a length of the trailer and adjacent to a trailer parking area of the loading dock; a baseplate having a plurality of wheels aligned with the track, the baseplate supporting the vertical post; and a motor coupled to drive at least one wheels to position the baseplate along the track.

(F4) Any of the embodiments (F1)-(F3) further including at least one wheel/caster positioned beneath the jackstand.

(G1) An automated jackstand system supports a front end of a trailer parked at a loading dock. The automated jackstand system includes: a vertical post; a swing arm supported at one end by the vertical post; a return spring for returning the swing arm to a resting position; a cable mechanically coupled with the vertical post and the swing arm; and a jackstand coupled with a distal end of the swing arm.

(G2) In the embodiment (G1), pulling the cable rotates the swing arm and the jackstand about the vertical post to position the jackstand beneath the front end of the trailer.

(G3) Either of the embodiments (G1) or (G2) further including a motor operable to extend and retract a vertical support of the jackstand.

What is claimed is:

1. An automated jackstand system for supporting a trailer parked at a loading dock, comprising:
   a jack pad;
   a vertically extendable component coupling at a first end with the jack pad, the vertically extendable component at least partially embedded into the ground; and
   a controller for remotely extending the vertically extendable component to press the jack pad against a lower surface of a front end of the trailer.

2. The automated jackstand system of claim 1, the jack pad comprising one of a horizontal disc and a horizontal beam.

3. The automated jackstand system of claim 1, further comprising at least one sensor for sending feedback indicative of correct deployment of the automated jackstand system to the controller.

4. The automated jackstand system of claim 1, further comprising:
   a track aligned with a length of the trailer and positioned centrally within a trailer parking area of the loading dock;
   a baseplate having a plurality of wheels aligned with the track, the baseplate supporting the vertically extendable component.

5. The automated jackstand system of claim 4, further comprising a motor coupled to drive at least one wheels to position the baseplate along the track.

6. The automated jackstand of claim 1, the vertically extendable component comprising a scissor mechanism.

7. The automated jackstand of claim 1, the vertically extendable component being foldable between a deployed and not-deployed state.

8. The automated jackstand of claim 1, wherein, in the not-deployed state, the vertically extendable component is below a ground clearance height.

9. An automated jackstand system for supporting a trailer parked at a loading dock, comprising:
   a jack pad;
   a vertically extendable component coupling at a first end with the jack pad;
   a track aligned with a length of the trailer and positioned centrally within a trailer parking area of the loading dock;
   a baseplate having a plurality of wheels aligned with the track, the baseplate supporting the vertically extendable component; and
   a controller for remotely extending the vertically extendable component to press the jack pad against a lower surface of a front end of the trailer.

10. The automated jackstand system of claim 9, the vertically extendable component comprising a hydraulic piston that is at least partially embedded into the ground.

11. The automated jackstand system of claim 9, the vertically extendable component comprising a scissor mechanism that is at least partially embedded into the ground.

12. The automated jackstand system of claim 9, the vertically extendable component comprising a screw mechanism that is at least partially embedded into the ground.

13. The automated jackstand system of claim 9, the jack pad comprising one of a horizontal disc and a horizontal beam.

14. The automated jackstand system of claim 9, further comprising at least one sensor for sending feedback indicative of correct deployment of the automated jackstand system to the controller.

15. The automated jackstand of claim 9, the vertically extendable component being foldable between a deployed and not-deployed state.

16. The automated jackstand of claim 9, wherein, in the not-deployed state, the vertically extendable component is below a ground clearance height.

17. The automated jackstand of claim 9, further comprising a motor coupled to drive at least one wheels to position the baseplate along the track.

18. The automated jackstand of claim 9, further comprising at least one of a sensor or encoder for determining a location of the baseplate along the track.

19. The automated jackstand of claim 9, further comprising a sensing device that provides input to the controller, the controller using the input to detect a front end of a trailer.

20. The automated jackstand of claim 19, the sensing device being at least one of a rangefinder and a camera.

* * * * *